United States Patent
Tsujimoto et al.

(10) Patent No.: US 8,534,051 B2
(45) Date of Patent: Sep. 17, 2013

(54) EXHAUST PURIFICATION DEVICE OF INTERNAL COMBUSTION ENGINE

(75) Inventors: Kenichi Tsujimoto, Susono (JP); Mikio Inoue, Susono (JP); Shinya Hirota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 552 days.

(21) Appl. No.: 12/740,138

(22) PCT Filed: Dec. 26, 2008

(86) PCT No.: PCT/JP2008/073958
§ 371 (c)(1),
(2), (4) Date: Apr. 28, 2010

(87) PCT Pub. No.: WO2009/082035
PCT Pub. Date: Jul. 2, 2009

(65) Prior Publication Data
US 2010/0242459 A1    Sep. 30, 2010

(30) Foreign Application Priority Data

Dec. 26, 2007 (JP) ................... 2007-335212
Dec. 26, 2007 (JP) ................... 2007-335226
Dec. 26, 2007 (JP) ................... 2007-335231
Dec. 26, 2007 (JP) ................... 2007-335261

(51) Int. Cl.
*F01N 3/00*    (2006.01)
(52) U.S. Cl.
USPC ................ 60/286; 60/274; 60/282; 60/285; 60/295

(58) Field of Classification Search
USPC ................................... 60/274–324
See application file for complete search history.

(56) References Cited

U.S. PATENT DOCUMENTS

| | | | |
|---|---|---|---|
| 7,048,895 B2 * | 5/2006 | Shirahata et al. | 422/180 |
| 7,093,428 B2 * | 8/2006 | LaBarge et al. | 60/286 |

(Continued)

FOREIGN PATENT DOCUMENTS

| | | |
|---|---|---|
| EP | 1 867 854 A1 | 12/2007 |
| JP | 6-93902 | 4/1994 |

(Continued)

OTHER PUBLICATIONS

Office Action issued Nov. 8, 2011 in Japan Application No. 2007-335261.

(Continued)

*Primary Examiner* — Thomas Denion
*Assistant Examiner* — Jesse Bogue
(74) *Attorney, Agent, or Firm* — Oblon, Spivak, McClelland, Maier & Neustadt, L.L.P.

(57) ABSTRACT

An internal combustion engine in an engine exhaust passage of which an exhaust purification catalyst (13) having an oxidation function is arranged and in the engine exhaust passage upstream of the exhaust purification catalyst (13) of which a small-sized oxidation catalyst (14) and a fuel feed valve (15) for feeding fuel to the small-sized oxidation catalyst (14) are arranged. When activating the exhaust purification catalyst (13), the fuel fed from the fuel injector (15) is used to heat the small-sized oxidation catalyst (14) and when the exhaust purification catalyst (13) is further raised in temperature, the fuel fed from the fuel feed valve (15) is increased and reformed fuel is exhausted from the small-sized oxidation catalyst (14).

27 Claims, 31 Drawing Sheets

(56) References Cited

U.S. PATENT DOCUMENTS

| | | | |
|---|---|---|---|
| 7,624,570 B2 * | 12/2009 | Reuter et al. | 60/286 |
| 7,810,315 B2 * | 10/2010 | Yan | 60/286 |
| 2004/0139739 A1 | 7/2004 | Kagenishi | |
| 2006/0107655 A1 | 5/2006 | Hanitzsch et al. | |
| 2007/0028602 A1 | 2/2007 | Dalla Betta et al. | |
| 2007/0079602 A1 * | 4/2007 | Hu et al. | 60/286 |
| 2007/0256407 A1 | 11/2007 | Reuter | |
| 2007/0277509 A1 | 12/2007 | Tahara et al. | |
| 2008/0196398 A1 * | 8/2008 | Yan | 60/299 |
| 2009/0320455 A1 * | 12/2009 | Fresnet et al. | 60/286 |
| 2010/0154390 A1 * | 6/2010 | Tsujimoto | 60/287 |
| 2010/0192544 A1 * | 8/2010 | Tsujimoto | 60/277 |
| 2011/0041487 A1 * | 2/2011 | Tsujimoto et al. | 60/299 |

FOREIGN PATENT DOCUMENTS

| | | | |
|---|---|---|---|
| JP | 9-96212 | | 4/1997 |
| JP | 11 350941 | | 12/1999 |
| JP | 2000-120432 | | 4/2000 |
| JP | 2002-543337 | | 12/2002 |
| JP | 2003 65042 | | 3/2003 |
| JP | 2004 176571 | | 6/2004 |
| JP | 2004-197635 | | 7/2004 |
| JP | 2005 125257 | | 5/2005 |
| JP | 2005-127257 | * | 5/2005 |
| JP | 2005 127257 | | 5/2005 |
| JP | 2005-264894 | | 9/2005 |
| JP | 2007 9718 | | 1/2007 |
| JP | 2007 40221 | | 2/2007 |
| JP | 2007-132202 | | 5/2007 |
| WO | 2006 109850 | | 10/2006 |
| WO | WO 2007/073957 A1 | | 7/2007 |

OTHER PUBLICATIONS

Office Action issued on Mar. 22, 2012 in the corresponding Japanese Patent Application No. 2007-335261.

European Office Action issued Apr. 19, 2012 in Patent Application No. 08 865 277.1.

Extended European Search Report issued Sep. 14, 2011, in Patent Application No. 08865277.1.

* cited by examiner

Fig.1
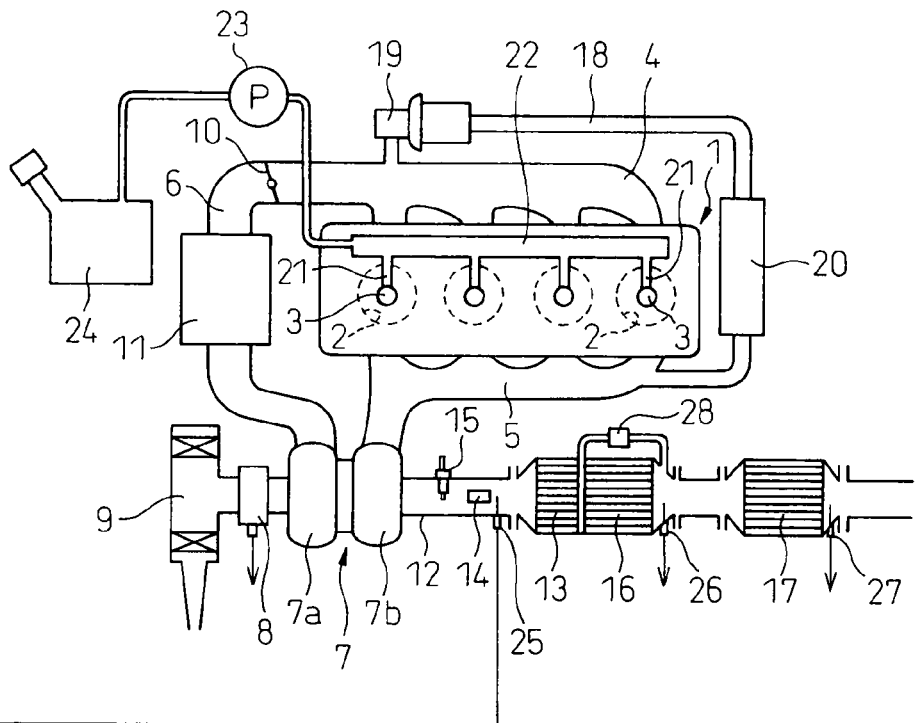
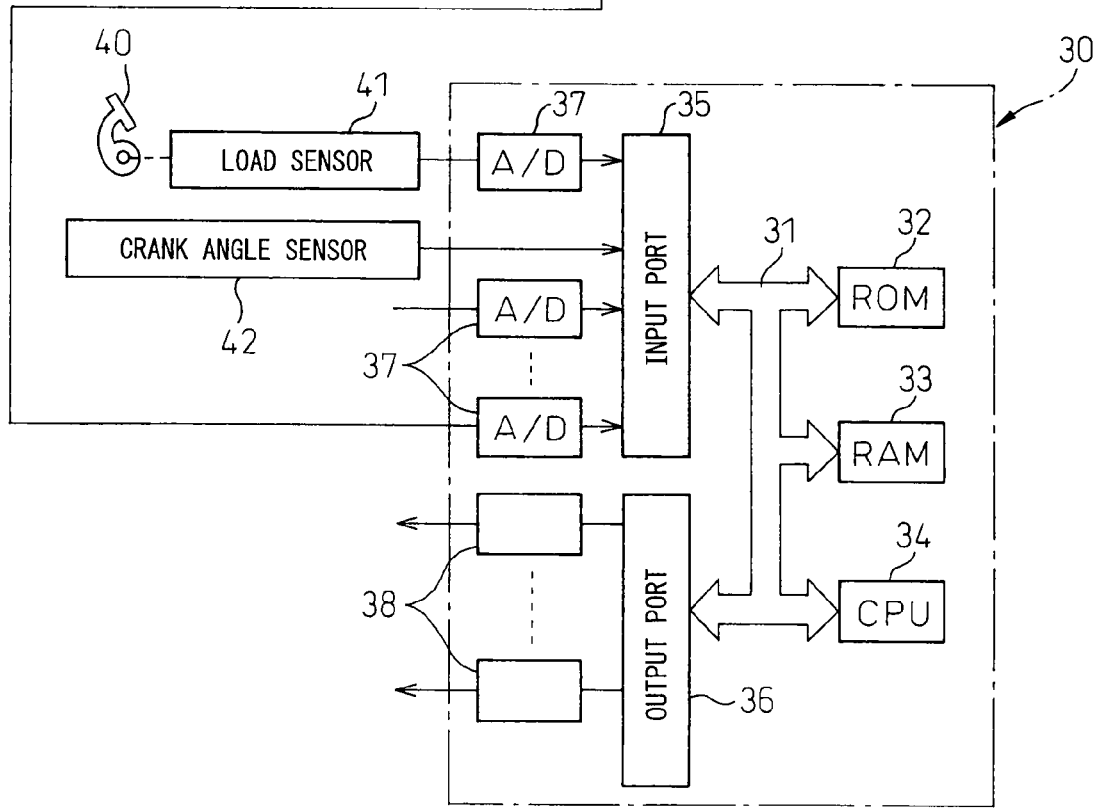

Fig.2
(A)
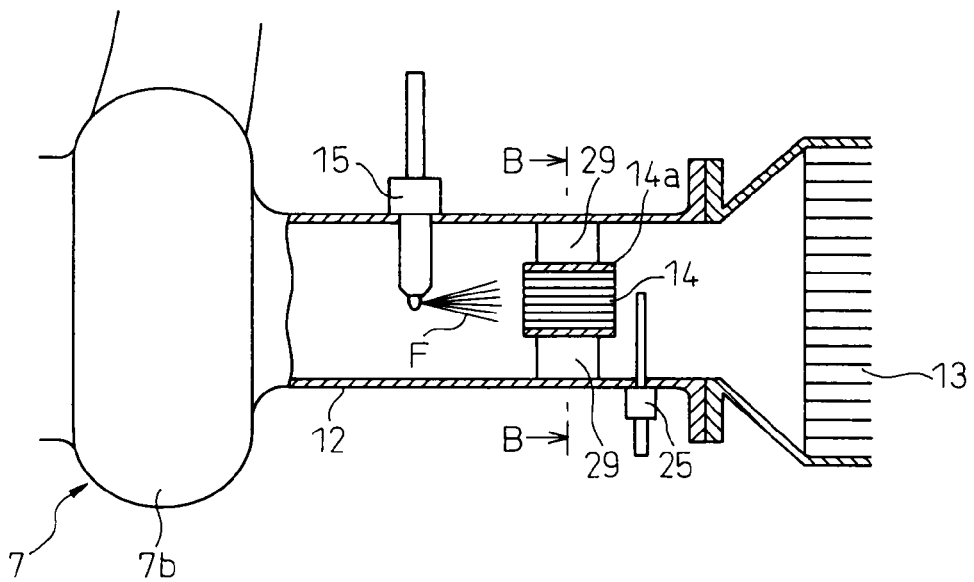
(B)
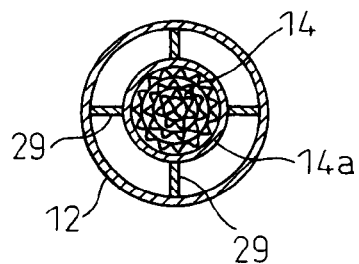
Fig.3
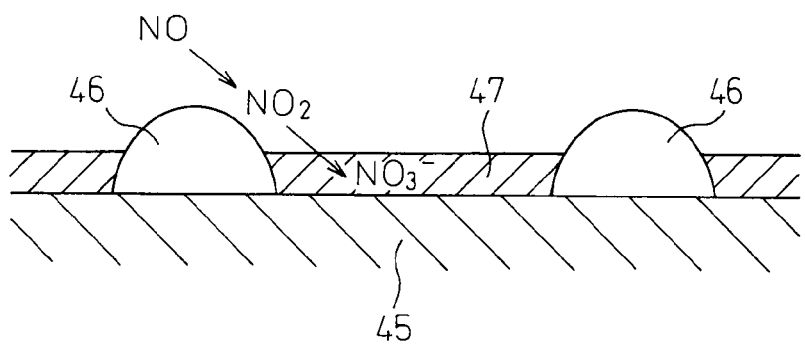

Fig.11
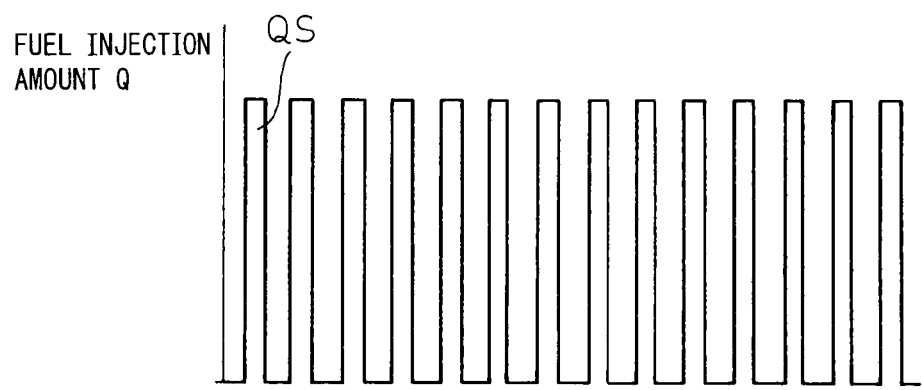
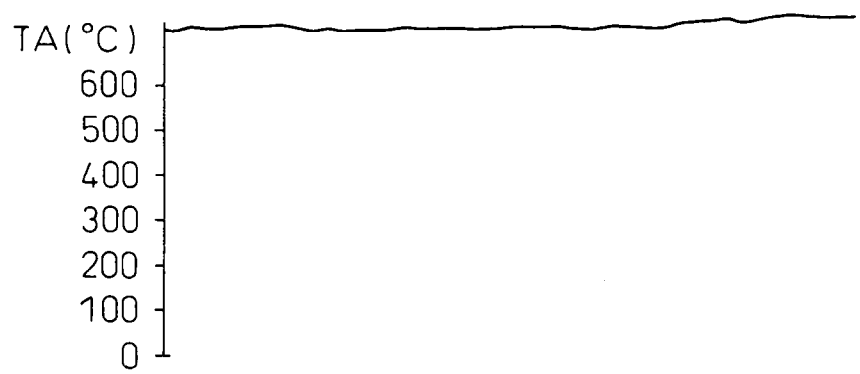
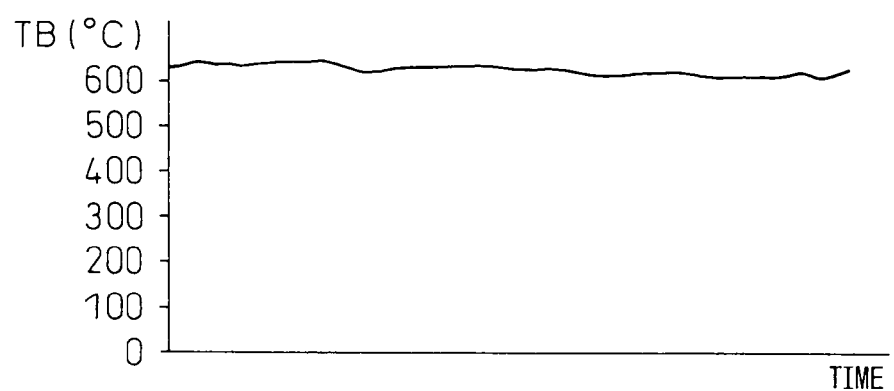

TQ | $QA_{11}$   $QA_{21}$  $-----$  $QA_{m1}$
$QA_{12}$
$\vdots$
$QA_{1n}$ $-----------$ $QA_{mn}$
N (B)

TQ | $QB_{11}$   $QB_{21}$  $-----$  $QB_{m1}$
$QB_{12}$
$\vdots$
$QB_{1n}$ $-----------$ $QB_{mn}$
N (C)

TQ | $QN_{11}$   $QN_{21}$  $-----$  $QN_{m1}$
$QN_{12}$
$\vdots$
$QN_{1n}$ $-----------$ $QN_{mn}$
N (D)

TQ | $QS_{11}$   $QS_{21}$  $-----$  $QS_{m1}$
$QS_{12}$
$\vdots$
$QS_{1n}$ $-----------$ $QS_{mn}$
N Fig.17
(A)
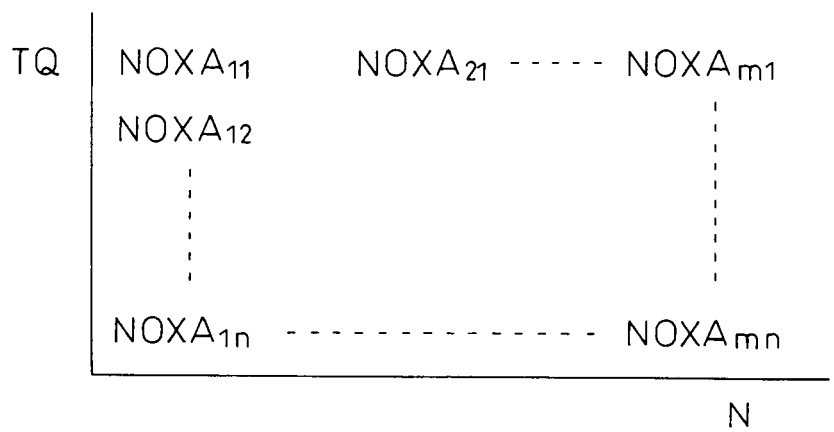
(B)
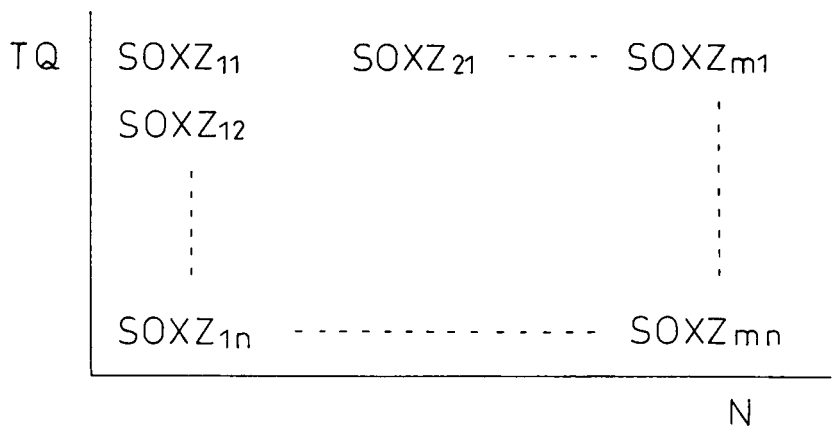

TQ | QPB$_{11}$  QPB$_{21}$  - - - - -  QPB$_{m1}$
   | QPB$_{12}$
   |
   | QPB$_{1n}$  - - - - - - - - - - -  QPB$_{mn}$
   |_____ N (C)

TQ | QPN$_{11}$  QPN$_{21}$  - - - - -  QPN$_{m1}$
   | QPN$_{12}$                          ⋮
   | ⋮
   | QPN$_{1n}$  - - - - - - - - - - -  QPN$_{mn}$
   |_____ N (D)

TQ | QPS$_{11}$  QPS$_{21}$  - - - - -  QPS$_{m1}$
   | QPS$_{12}$                          ⋮
   | ⋮
   | QPS$_{1n}$  - - - - - - - - - - -  QPS$_{mn}$
   |_____ N

Fig. 26
(A)
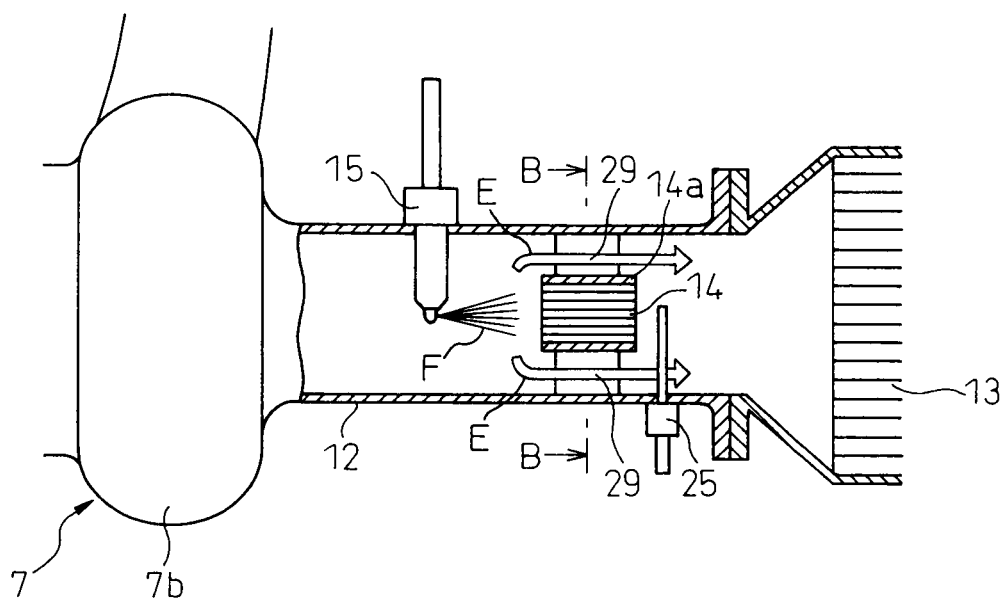
(B)
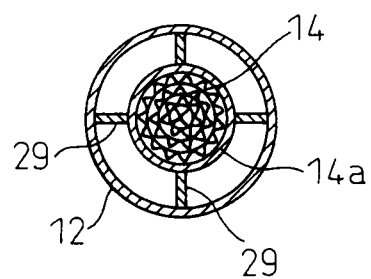

Fig. 27
(A)
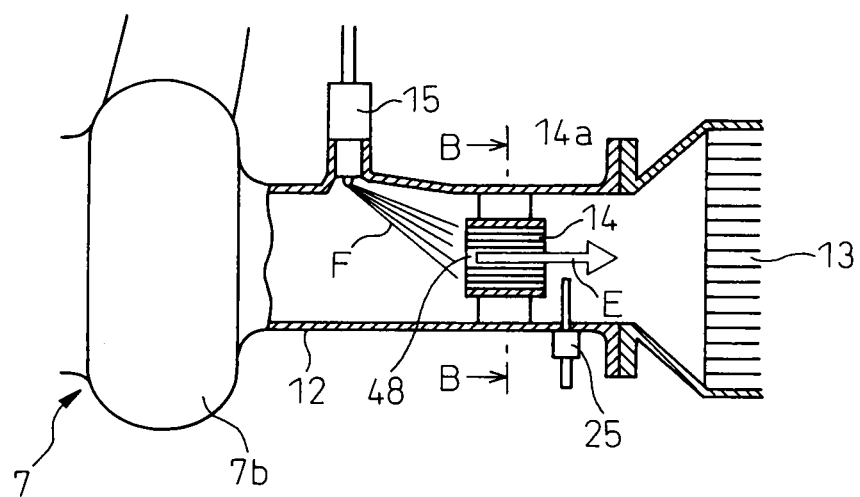
(B)
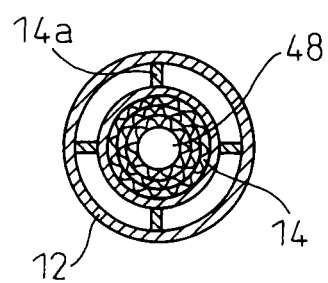

Fig.30
(A)
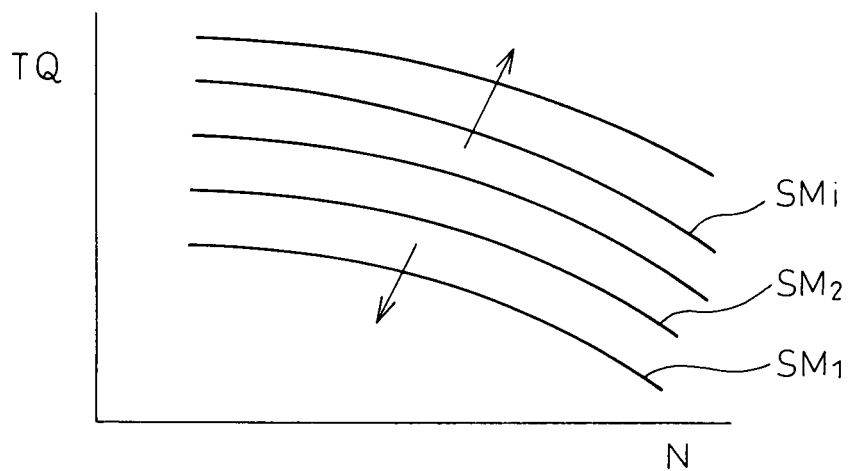
(B)
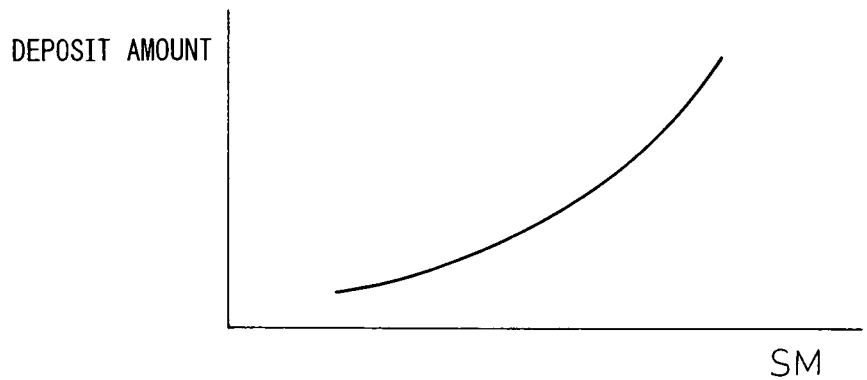
(C)
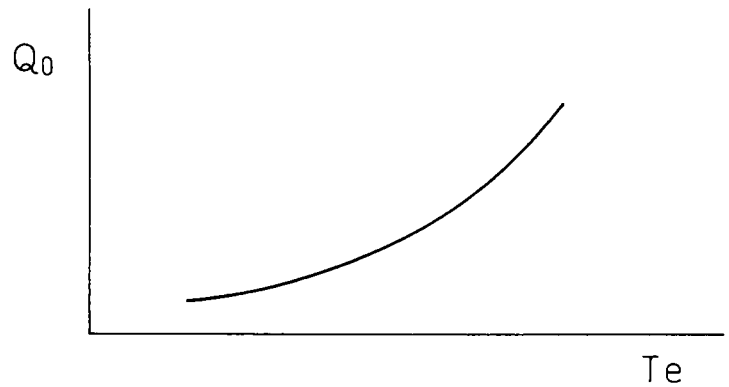

Fig. 31
(A)
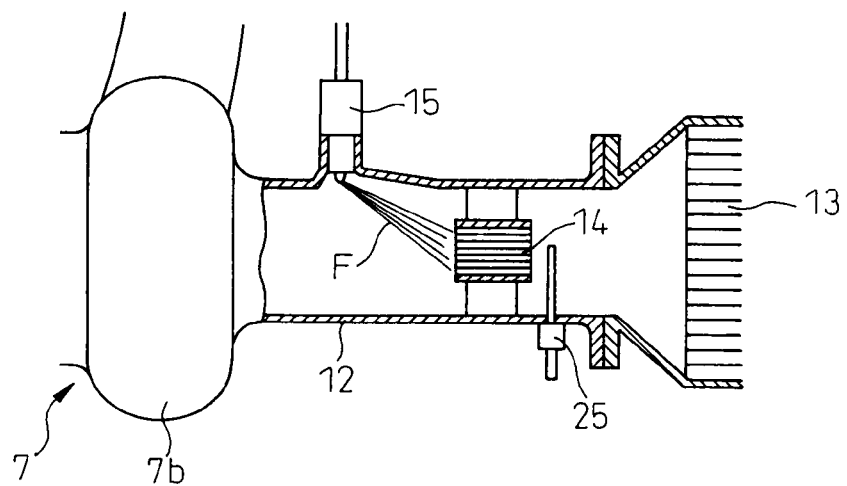
(B)
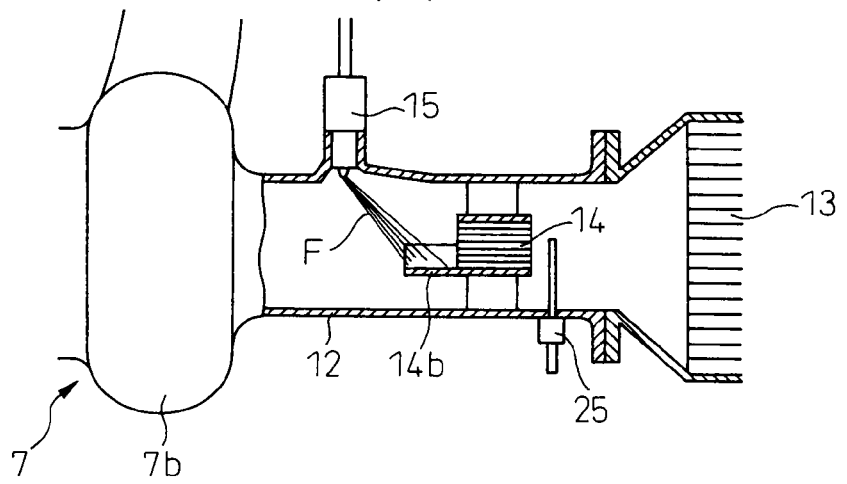
(C)
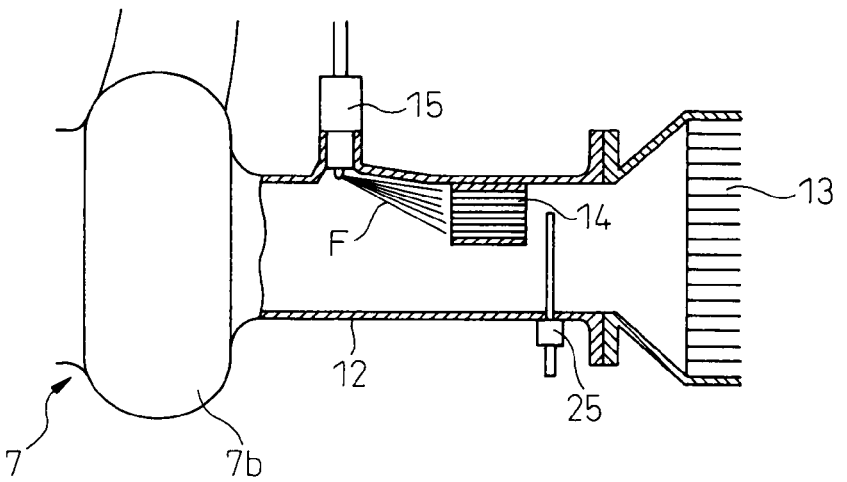

Fig. 32
(A)
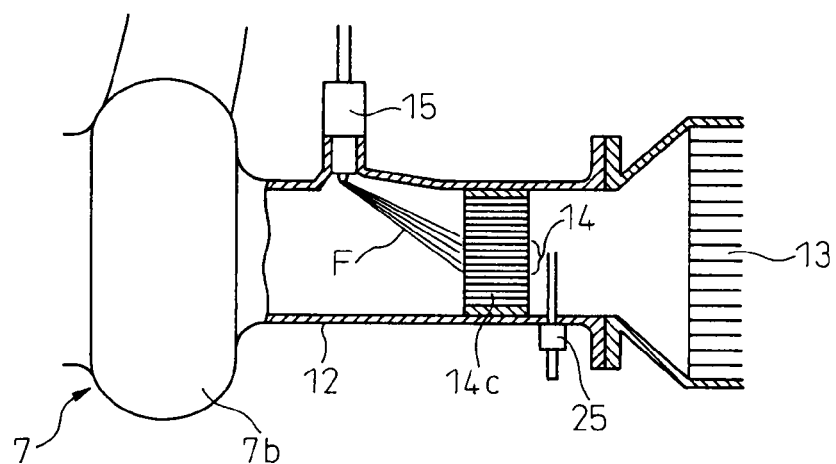
(B)
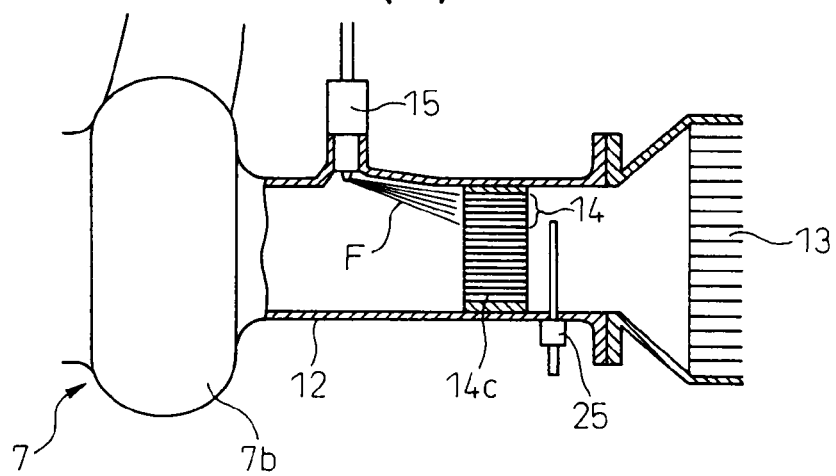
(C)
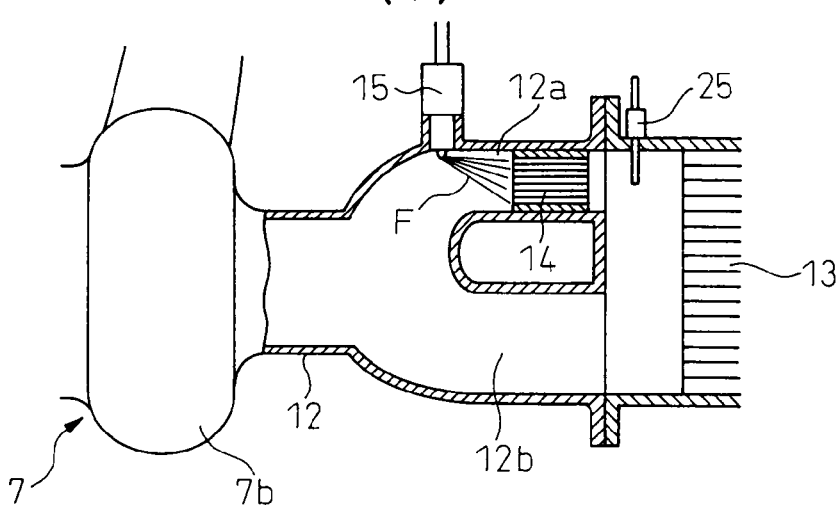

Fig. 33
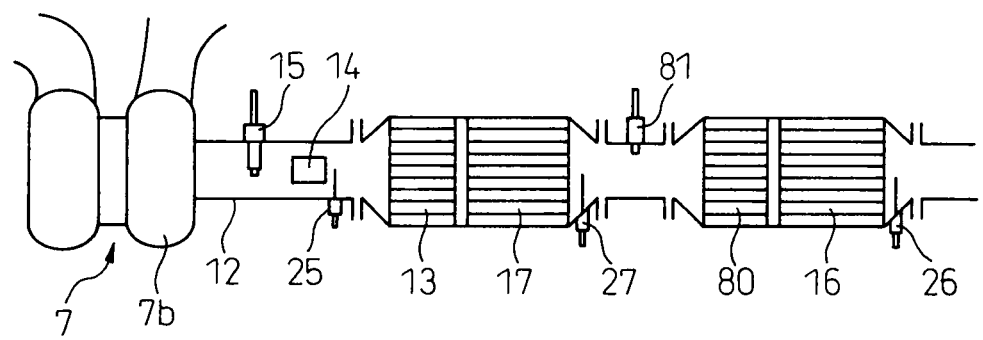
(A)
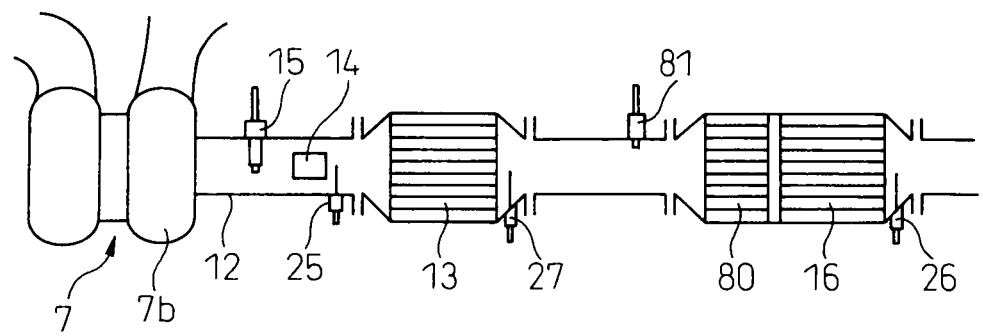
(B)
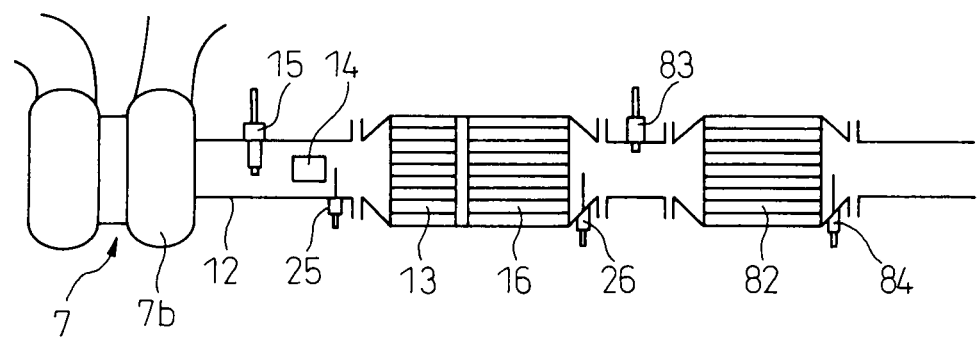
(C)

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine configured arranging in an engine exhaust passage an $NO_x$ storage catalyst storing $NO_x$ contained in exhaust gas when an air-fuel ratio of the inflowing exhaust gas is lean and releasing the stored $NO_x$ when the air-fuel ratio of the inflowing exhaust gas becomes rich, arranging in the engine exhaust passage upstream of the $NO_x$ storage catalyst a small-sized fuel reforming catalyst having a cross-section smaller than a cross-section of the exhaust passage to make part of the exhaust gas discharged from the engine flow into the fuel reforming catalyst, and injecting fuel toward an upstream side end face of the fuel reforming catalyst when the $NO_x$ storage catalyst should release $NO_x$ (for example, see Japanese Patent Publication (A) No. 2005-127257).

In this internal combustion engine, when the $NO_x$ storage catalyst should release $NO_x$, the injected fuel is reformed in the fuel reforming catalyst and the reformed fuel, for example, a high reducing ability fuel containing $H_2$ or CO, is sent to the $NO_x$ storage catalyst. As a result, the $NO_x$ released from the $NO_x$ storage catalyst can be reduced well.

However, even if the reformed fuel is sent into the $NO_x$ storage catalyst in this way, when no reduction reaction occurs in the $NO_x$ storage catalyst such as if the $NO_x$ storage catalyst is not activated, the problem arises that the reformed fuel sent to the $NO_x$ storage catalyst passes straight through the $NO_x$ storage catalyst and is discharged into the atmosphere. To prevent such a problem from occurring, it is necessary to control the feed of fuel to the fuel reforming catalyst to match the objective in accordance with the state of the fuel reforming catalyst or $NO_x$ storage catalyst.

DISCLOSURE OF INVENTION

An object of the present invention is to provide an exhaust purification device of an internal combustion engine configured to feed an amount of fuel commensurate with the objective.

According to the present invention, there is provided an exhaust purification device of an internal combustion engine, wherein an exhaust purification catalyst having an oxidation function is arranged in an engine exhaust passage, a small-sized oxidation catalyst having a volume smaller than the exhaust purification catalyst and run through by part of the exhaust gas flowing into the exhaust purification catalyst and a fuel feed valve for feeding fuel into the small-sized oxidation catalyst are arranged in the engine exhaust passage upstream of the exhaust purification catalyst, a first amount of fuel required for the small-sized oxidation catalyst to emit heat is fed from the fuel feed valve when using a heat of oxidation reaction generated at the small-sized oxidation catalyst due to the fuel fed from the fuel feed valve to raise the exhaust purification catalyst in temperature, and an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst.

BRIEF DESCRIPTION OF THE DRAWINGS

FIG. 1 is an overview of a compression ignition type internal combustion engine, FIG. 2 are enlarged views of a vicinity of a small-sized oxidation catalyst of FIG. 1, FIG. 3 is a view for explaining an action of absorbing and releasing $NO_x$, FIG. 11 is a time chart showing control of feed of a fourth amount QS of fuel from a fuel feed valve, FIG. 12 are views showing maps of the amounts of feed of fuel QA, QB, QN, and QS.

BEST MODE FOR CARRYING OUT THE INVENTION

Figure 4:
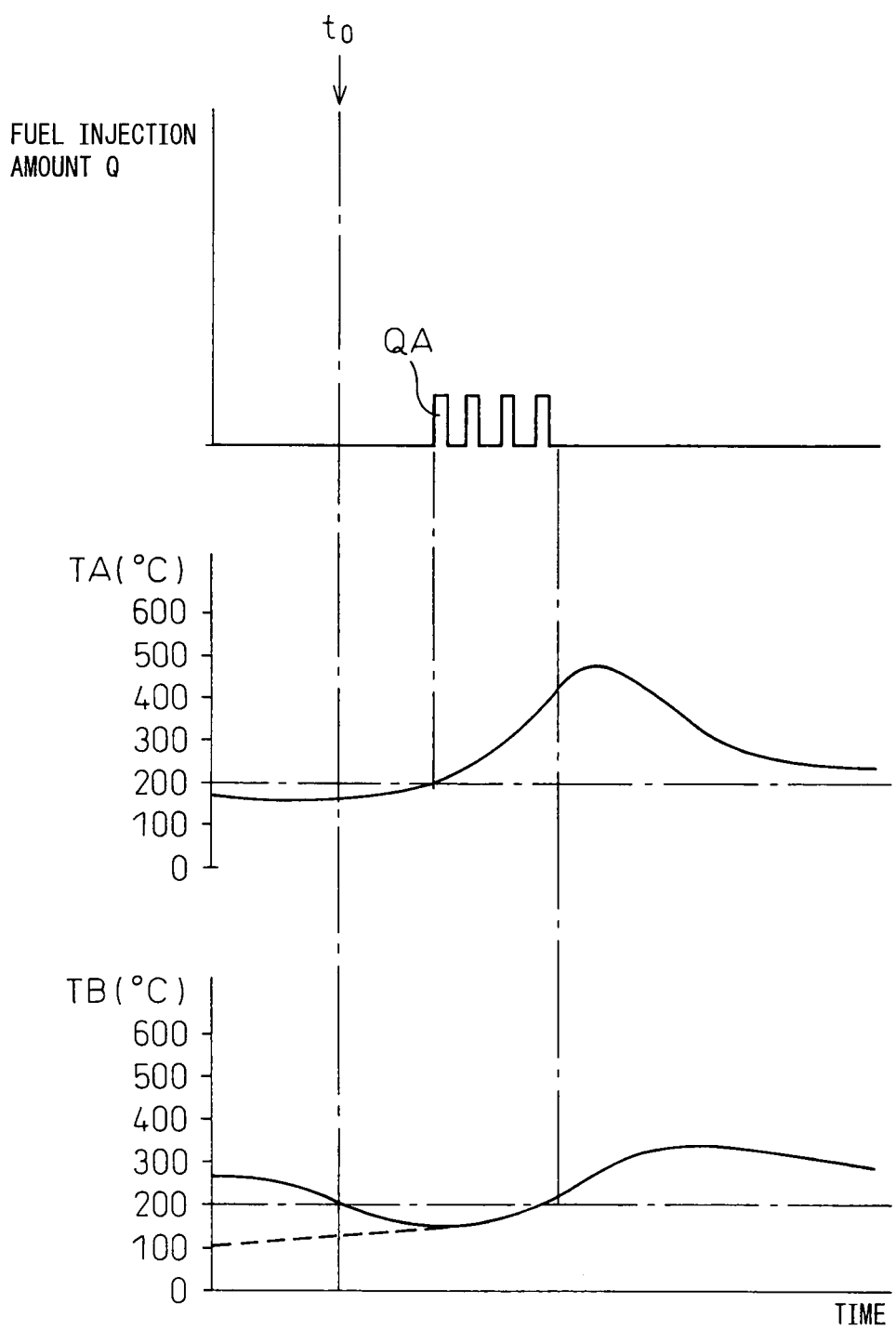
FIG. 4 is a time chart showing control of feed of a first amount QA of fuel from a fuel feed valve.

FIG. 1 shows an overview of a compression ignition type internal combustion engine.

Referring to FIG. 1, 1 shows an engine body, 2a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air detector 8 to an air cleaner 9. Inside the intake duct 6 is arranged a throttle valve 10 driven by a step motor. Further, around the intake duct 6 is arranged a cooling device 11 for cooling the intake air flowing inside the intake duct 6. In the embodiment shown in FIG. 1, the engine cooling water is guided into the cooling device 11 where the engine cooling water is used to cool the intake air.

On the other hand, the exhaust manifold 5 is connected to an inlet of an exhaust turbine 7b of the exhaust turbocharger 7, while an outlet of the exhaust turbine 7b is connected through an exhaust pipe 12 to an exhaust purification catalyst 13 having an oxidation function. In the engine exhaust passage upstream of this exhaust purification catalyst 13, that is, in the exhaust pipe 12, a small-sized oxidation catalyst 14 with a volume smaller than the exhaust purification catalyst 13 and run through by part of the exhaust gas flowing into the exhaust purification catalyst 13 is arranged. In the engine exhaust passage upstream of this small-sized oxidation catalyst 14, that is, in the exhaust pipe 12, a fuel feed valve 15 for feeding fuel to the small-sized oxidation catalyst 14 is arranged.

In the embodiment shown in FIG. 1, this exhaust purification catalyst 13 is comprised of an oxidation catalyst. Inside the engine exhaust passage downstream of the exhaust purification catalyst 13, that is, downstream of the oxidation catalyst 13, a particulate filter 16 is arranged for trapping particulate in the exhaust gas. Further, in the embodiment shown in FIG. 1, in the engine exhaust passage downstream of the particulate filter 16, an $NO_x$ storage catalyst 17 is arranged.

The exhaust manifold 5 and the intake manifold 4 are connected to each other through an exhaust gas recirculation (hereinafter referred to as the "EGR") passage 18. Inside the EGR passage 18 is arranged an electronic control type EGR control valve 19. Further, around the EGR passage 18 is arranged a cooling device 20 for cooling the EGR gas flowing through the inside of the EGR passage 18. In the embodiment shown in FIG. 1, the engine cooling water is guided inside the cooling device 20 where the engine cooling water is used to cool the EGR gas. On the other hand, each fuel injector 3 is connected through a fuel feed pipe 21 to a common rail 22. This common rail 22 is connected through an electronic control type variable discharge fuel pump 23 to a fuel tank 24. The fuel stored inside the fuel tank 24 is fed to the inside of the common rail 22 by the fuel pump 23. The fuel fed to the common rail 22 is fed through each fuel feed pipe 21 to a fuel injector 3.

An electronic control unit 30 is comprised of a digital computer and is provided with a ROM (read only memory) 32, RAM (random access memory) 33, CPU (microprocessor) 34, input port 35, and output port 36, which are connected with each other by a bi-directional bus 31. Downstream of the small-sized oxidation catalyst 14, a temperature sensor 25 for detecting the temperature of the small-sized oxidation catalyst 14 is arranged. Downstream of the particulate filter 16, a temperature sensor 26 for detecting the temperature of the oxidation catalyst 13 or particulate filter 16 is arranged. Downstream of the $NO_x$ storage catalyst 17, a temperature sensor 27 for detecting the temperature of the $NO_x$ storage catalyst 17 is arranged. The output signals of these temperature sensors 25, 26, and 27 are input through corresponding AD converters 37 to the input port 35.

Further, the particulate filter 16 has a differential sensor 28 attached to it for detecting the differential pressure before and after the particulate filter 16. The output signals of this differential sensor 28 and the intake air detector 8 are input through corresponding AD converters 37 to the input port 35.

An accelerator pedal 40 is connected to a load sensor 41 generating an output voltage proportional to the depression amount L of the accelerator pedal 40. The output voltage of the load sensor 41 is input through the corresponding AD converter 37 to the input port 35. Further, the input port 35 has a crank angle sensor 42 generating an output pulse every time the crankshaft rotates by for example 15° connected to it. On the other hand, the output port 36 has the fuel injectors 3, throttle valve 10 drive step motor, EGR control valve 19, and fuel pump 23 connected to it through corresponding drive circuits 38.

FIG. 2(A) shows an enlarged view of a vicinity of the small-sized oxidation catalyst 14 in FIG. 1, while FIG. 2(B) shows a cross-sectional view along the line B-B in FIG. 2(A). In the embodiment shown in FIGS. 2(A) and (B), the small-sized oxidation catalyst 14 has a substrate comprised of a laminate structure of flat metal sheets and corrugated metal sheets. On the surface of this substrate, for example, a layer of a catalyst carrier comprised of alumina is formed. On this catalyst carrier, a precious metal catalyst such as platinum Pt, rhodium Rd, or palladium Pd is carried. Note that this substrate may also be formed from cordierite.

As will be understood from FIGS. 2(A) and (B), this small-sized oxidation catalyst 14 forms a tubular shape having a smaller cross-section than the exhaust purification catalyst 13, that is, the total cross-sectional flow area of the exhaust gas heading toward the oxidation catalyst 13, that is, the cross-section of the exhaust pipe 12, and extending in the direction of flow of exhaust gas at the center of the exhaust pipe 12. Note that, in the embodiment shown in FIGS. 2(A) and (B), the small-sized oxidation catalyst 14 is arranged inside a cylindrical outer frame 14a. This cylindrical outer frame 14a is supported by a plurality of stays 29 inside the exhaust pipe 12.

The oxidation catalyst 13 is formed from a monolithic catalyst carrying a precious metal catalyst such as for example platinum Pt. As opposed to this, in the embodiment shown in FIG. 1, the particulate filter 16 does not carry a precious metal catalyst. However, the particulate filter 16 may also carry a precious metal catalyst such as platinum Pt. In this case, the oxidation catalyst 13 may also be omitted.

On the other hand, the NO storage catalyst 17 shown in FIG. 1 carries on its substrate a catalyst carrier such as for example alumina. FIG. 3 schematically illustrates the cross-section of the surface part of this catalyst carrier 45. As shown in FIG. 3, the surface of the catalyst carrier 45 carries a precious metal catalyst 46 diffused in it. Furthermore, the surface of the catalyst carrier 45 is formed with a layer of an $NO_x$ absorbant 47.

In the example shown in FIG. 3, as the precious metal catalyst 46, platinum Pt is used. As the ingredient forming the $NO_x$ absorbent 47, for example, at least one ingredient selected from potassium K, sodium Na, cesium Cs, or another such alkali metal, barium Ba, calcium Ca, or another such alkali earth, and lanthanum La, yttrium Y, or another such rare earth is used.

If the ratio of the air and fuel (hydrocarbons) fed inside the engine intake passage, combustion chambers 2, and exhaust passage upstream of the $NO_x$ storage catalyst 17 is referred to as the "air-fuel ratio of the exhaust gas", an $NO_x$ absorption and release action, such that the $NO_x$ absorbent 47 stores the $NO_x$ when the air-fuel ratio of the exhaust gas is lean and releases the absorbed $NO_x$ when the oxygen concentration in the exhaust gas falls is performed.

That is, explaining the case of using barium Ba as the ingredient forming the $NO_x$ absorbent 47 as an example, when the air-fuel ratio of the exhaust gas is lean, that is, when the oxygen concentration in the exhaust gas is high, the NO contained in the exhaust gas, as shown in FIG. 3, is oxidized on the platinum Pt 46 and becomes $NO_2$, next this is absorbed in the $NO_x$ absorbent 47 and, while bonding with the barium carbonate $BaCO3$, diffuses in the form of nitric acid ions $NO_3^-$ inside the $NO_x$ absorbent 47. In this way, the $NO_x$ is stored in the $NO_x$ absorbent 47. So long as the oxygen concentration in the exhaust gas is high, $NO_2$ is produced on the surface of the platinum Pt 46. So long as the $NO_x$ absorption ability of the $NO_x$ absorbent 47 is not saturated, the $NO_2$ is absorbed in the $NO_x$ absorbent 47 and nitric acid ions $NO_3^-$ are produced.

As opposed to this, if the air-fuel ratio of the exhaust gas is made rich or the stoichiometric air-fuel ratio, the oxygen concentration in the exhaust gas falls, so the reaction proceeds in the opposite direction ($NO_3^- \rightarrow NO_2$) and therefore the nitric acid ions $NO_3^-$ in the $NO_x$ absorbent 47 are released in the form of $NO_2$ from the $NO_x$ absorbent 47. Next, the released $NO_x$ is reduced by the unburned HC and CO contained in the exhaust gas.

In this way, when the air-fuel ratio of the exhaust gas is lean, that is, when combustion is performed under a lean air-fuel ratio, the $NO_x$ in the exhaust gas is absorbed in the $NO_x$ absorbent 47. However, when combustion continues under a lean air-fuel ratio, during that time the $NO_x$ absorption ability of the $NO_x$ absorbent 47 ends up becoming saturated and therefore the $NO_x$ absorbent 47 ends up no longer being able to absorb the $NO_x$. Therefore, in the embodiment according to the present invention, before the adsorption ability of the $NO_x$ absorbent 47 becomes saturated, fuel is fed from the fuel feed valve 15 so as to temporarily make the air-fuel ratio of the exhaust gas rich and thereby make the $NO_x$ be released from the $NO_x$ absorbent 47.

However, exhaust gas contains $SO_x$, that is, $SO_2$. If this $SO_2$ flows into the $NO_x$ storage catalyst 17, this $SO_2$ is oxidized at the platinum Pt 46 and becomes $SO_3$. Next, this $SO_3$ is absorbed in the $NO_x$ absorbent 47 and, while bonding with the barium carbonate $BaCO3$, diffuses in the $NO_x$ absorbent 47 in the form of sulfuric acid ions $SO_4^{2-}$ to produce stable sulfate $BaSO_4$. However, the $NO_x$ absorbent 47 has a strong basicity, so this sulfate $BaSO_4$ is stable and hard to break down. With just making the air-fuel ratio of the exhaust gas rich, the sulfate $BaSO_4$ will not break down and will remain as it is. Therefore, in the $NO_x$ absorbent 47, as time elapses, the sulfate $BaSO_4$ increases. Therefore, along with the elapse of time, the $NO_x$ amount which can be absorbed by the $NO_x$ absorbent 47 falls. That is, the $NO_x$ storage catalyst undergoes sulfur poisoning.

In this regard, in this case, if raising the temperature of the NO storage catalyst 17 to the 600° C. or higher $SO_x$ release temperature and in that state making the air-fuel ratio of the exhaust gas flowing into the $NO_x$ storage catalyst 17 rich, the $SO_x$ is released from the $NO_x$ absorbant 47. Therefore, in the present invention, when the $NO_x$ storage catalyst 17 suffers from sulfur poisoning, the fuel feed valve 15 is made to feed fuel so as to raise the temperature of the $NO_x$ storage catalyst 17 to the $SO_x$ release temperature and make the air-fuel ratio of the exhaust gas flowing into the $NO_x$ storage catalyst 17 rich so as to make the $NO_x$ storage catalyst 17 release $SO_x$.

Now, in the embodiment shown in FIG. 2, the nozzle port of the fuel feed valve 15 is arranged at the center of the cross-section of the exhaust pipe 12. Fuel F, that is, diesel oil F, is injected from this nozzle port toward an upstream side end face of the small-sized oxidation catalyst 14. At this time, if the small-sized oxidation catalyst 14 is activated, the fuel can be oxidized in the small-sized oxidation catalyst 14. The heat of oxidation reaction produced at this time can be used to raise the temperature of the small-sized oxidation catalyst 14.

In this regard, the inside of the small-sized oxidation catalyst 14 has a large flow resistance, so the amount of the exhaust gas flowing through the inside of the small-sized oxidation catalyst 14 is small. Further, if an oxidation reaction occurs in the small-sized oxidation catalyst 14, gas expands in the small-sized oxidation catalyst 14, so the amount of exhaust gas flowing through the inside of the small-sized oxidation catalyst 14 further decreases. If the oxidation reaction causes the gas temperature to further rise, the gas rises in viscosity, so the amount of exhaust gas flowing through the small-sized oxidation catalyst 14 is further reduced. Therefore, the flow rate of the exhaust gas in the small-sized oxidation catalyst 14 is considerably slower than the flow rate of the exhaust gas flowing inside the exhaust pipe 12.

In this way, since the flow rate of the exhaust gas in the small-sized oxidation catalyst 14 is slow, the oxidation reaction in the small-sized oxidation catalyst 14 becomes more active. Further, since the small-sized oxidation catalyst 14 is small in volume, the small-sized oxidation catalyst 14 rapidly rises in temperature to a considerably high temperature. Further, if the small-sized oxidation catalyst 14 rises in temperature, the hydrocarbons in the fuel with the large number of carbon atoms break down resulting in the production of high reactivity hydrocarbons with fewer carbon atoms. That is, the fuel is reformed into high reactivity fuel. Therefore, if the small-sized oxidation catalyst 14 is fed with fuel, the small-sized oxidation catalyst 14 on the one hand forms a rapid heat generator which rapidly generates heat and on the other hand forms a reformed fuel discharger discharging reformed fuel.

In this regard, for example, if making the small-sized oxidation catalyst 14 discharge the reformed fuel when the oxidation catalyst 13 is not activated, this reformed fuel would pass straight through the oxidation catalyst 13 without being oxidized at the oxidation catalyst 13 and therefore the problem would arise of the reformed fuel ending up being discharged into the atmosphere. Further, when the small-sized oxidation catalyst 14 is not activated, if feeding fuel from the fuel feed valve 15 as well, the problem would arise of the fuel ending up being discharged into the atmosphere.

In the first embodiment according to the present invention, the optimal fuel feed control for the objective is performed so that such a problem does not occur. Below, referring to FIG. 4 to FIG. 11, fuel feed control executed in the first embodiment according to the present invention will be successively explained. Note that, FIG. 4 to FIG. 11 show the changes in the fuel injection amount Q from the fuel feed valve 15, the temperature TA of the small-sized oxidation catalyst 14, and the temperature TB of the exhaust purification catalyst 13. In FIG. 4 to FIG. 11, the timing $t_0$ shows the time when a command was issued to start injection of fuel from the fuel feed valve 15 for raising the temperature or any other purpose. Further, FIG. 4 to FIG. 11 show as an example the case of the small-sized oxidation catalyst 14 and exhaust purification catalyst 13 both being activated at 200° C.

Figure 5:
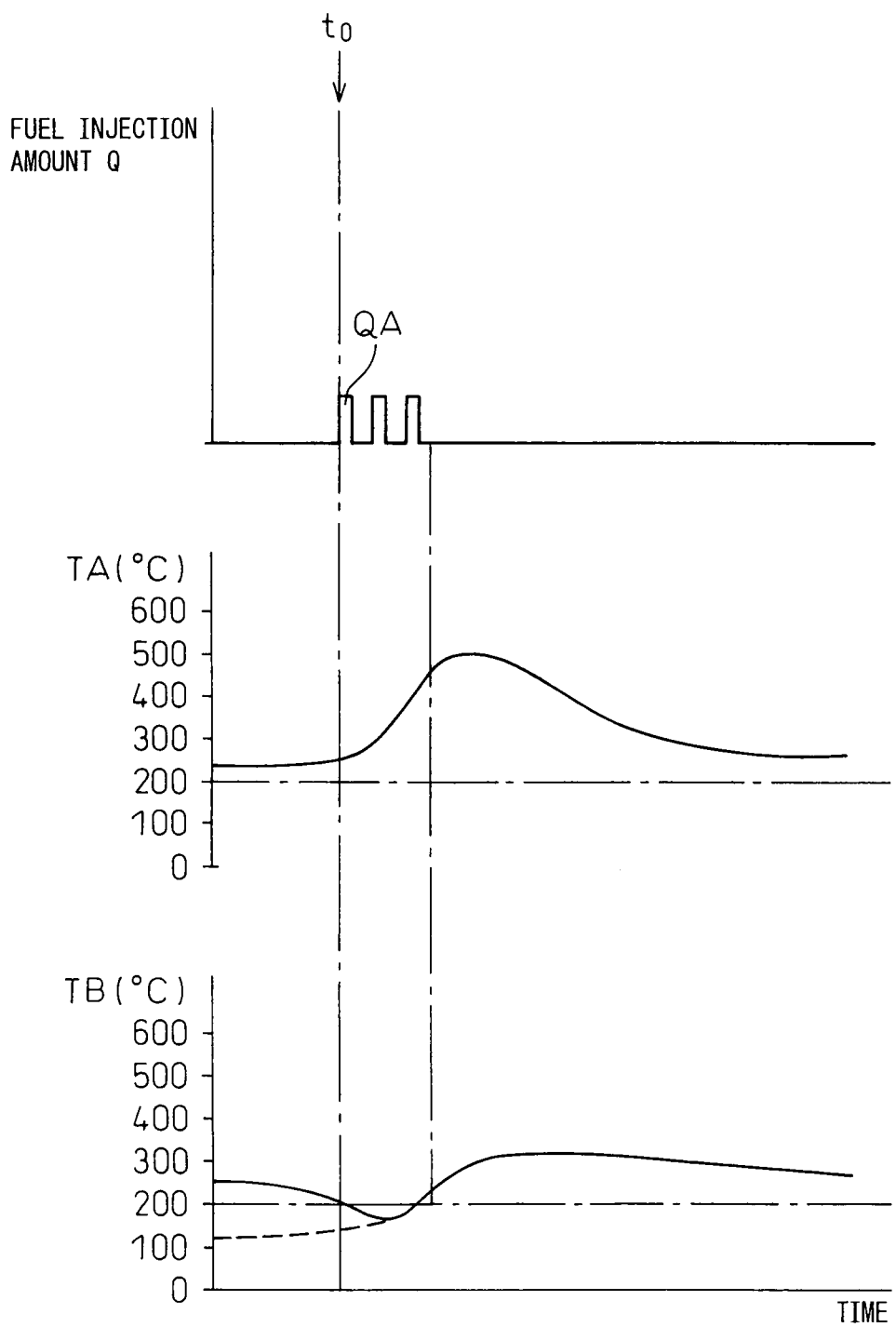
FIG. 5 is a time chart showing control of feed of a first amount QA of fuel from a fuel feed valve.

First of all, if explaining FIG. 4 and FIG. 5, these FIG. 4 and FIG. 5 show the case where the heat of the oxidation reaction occurring at the small-sized oxidation catalyst 14 is used to activate the exhaust purification catalyst 13. Note that, in the graphs showing the changes in the temperature TB of the exhaust purification catalyst 13 of FIG. 4 and FIG. 5, the broken lines show the case where a fuel injection command is issued to activate the exhaust purification catalyst 13 at the timing $t_0$ when the exhaust purification catalyst 13 is not activated such as at the time of engine start, while the solid lines show the case where a command for injection of fuel is issued so as to activate the exhaust purification catalyst 13 when the exhaust purification catalyst 13 changes from the activated state to the non-active state at the timing $t_0$.

FIG. 4, as will be understood from the temperature TA of the small-sized oxidation catalyst 14, shows the case where the small-sized oxidation catalyst 14 is not activated at the timing $t_0$. When the small-sized oxidation catalyst 14 is not activated, even if injecting fuel from the fuel feed valve 15, this injected fuel will not react by oxidation in the small-sized oxidation catalyst 14, but will pass straight through the small-sized oxidation catalyst 14 and be discharged into the atmosphere. Therefore, in this case, as shown in FIG. 4, after the small-sized oxidation catalyst 14 is activated, fuel injection from the fuel feed valve 15 is started.

When fuel injection from the fuel feed valve 15 is started, this injected fuel can be oxidized in the small-sized oxidation catalyst 14. At this time, due to the heat of oxidation reaction occurring at the small-sized oxidation catalyst 14, the exhaust purification catalyst 13 can be raised in temperature. At this time, the exhaust purification catalyst 13 is in a non-active state, so at this time, when reformed fuel is discharged from the small-sized oxidation catalyst 14, the reformed fuel passes straight through the exhaust purification catalyst 13 and is discharged into the atmosphere.

Therefore, at this time, the first amount QA of fuel necessary for the small-sized oxidation catalyst 14 to emit heat is fed from the fuel feed valve 15. In this case, in actuality, it is difficult to completely prevent the discharge of the reformed fuel from the small-sized oxidation catalyst 14. Therefore in the present invention, this first amount QA is made an amount necessary for suppressing the outflow of the reformed fuel from the small-sized oxidation catalyst 14 and enabling the small-sized oxidation catalyst 14 to emit heat.

That is, in the example shown in FIG. 4, when the exhaust purification catalyst 13 is not activated or when the exhaust purification catalyst 13 changes from the activated state to a non-active state, when the exhaust purification catalyst 13 should be activated, the first amount QA of fuel is fed from the fuel feed valve 15. In this case, when the small-sized oxidation catalyst 14 is not activated, the small-sized oxidation catalyst 14 is activated, then the first amount QA of fuel starts to be fed.

On the other hand, FIG. 5 shows the case where the small-sized oxidation catalyst 14 is activated at the timing $t_0$. In this case, as shown in FIG. 5, at the timing $t_0$, the first amount QA of fuel immediately starts to be fed from the fuel feed valve 15. Note that, in both the cases shown in FIG. 4 and FIG. 5, fuel is intermittently fed in pulses from the fuel feed valve 15. When the exhaust purification catalyst 13 is activated, the feed of fuel is stopped.

FIG. 6 to FIG. 9 show the fuel feed control when reforming fuel fed from the fuel feed valve 15 by the small-sized oxidation catalyst 14 and using the reformed fuel flowing out from the small-sized oxidation catalyst 14 to raise the temperature of the exhaust purification catalyst 13. At this time, a second amount QB of fuel greater than the first amount QA is intermittently injected from the fuel feed valve 15.

For example, to make the particulate deposited on the particulate filter 16 burn, the temperature of the particulate filter 16 has to be made to rise to 600° C. or so. Further, when making the $NO_x$ storage catalyst 17 release $SO_x$ as well, the temperature of the $NO_x$ storage catalyst 17 has to be made to rise to the 600° C. or higher $SO_x$ release temperature. In this case, a large amount of the reformed fuel is made to be discharged from the small-sized oxidation catalyst 14 to make the reformed fuel oxidize in the exhaust purification catalyst 13. The heat of oxidation reaction generated at this time is used to make the particulate filter 16 or $NO_x$ storage catalyst 17 rise in temperature.

To make the small-sized oxidation catalyst 14 discharge a large amount of the reformed fuel, that is, to increase the amount of outflow of the reformed fuel from the small-sized oxidation catalyst 14 compared with the first amount QA, it is necessary to increase the amount of fuel injection from the fuel feed valve 15. Therefore, the second amount QB injected at this time is considerably increased over the first amount QA. If the fuel injection amount is increased, the temperature of the small-sized oxidation catalyst 14 becomes further higher than the time of the first amount QA, so the heat of oxidation reaction of the small-sized oxidation catalyst 14 may also be used so as to make the exhaust purification catalyst 13 rise temperature. When the small-sized oxidation catalyst 13 becomes a high temperature, reformation of the fuel is further promoted, so the oxidation reaction of the fuel at the exhaust purification catalyst 13 is further promoted. Therefore, the exhaust purification catalyst 13 can be made to rapidly rise in temperature.

Figure 6:
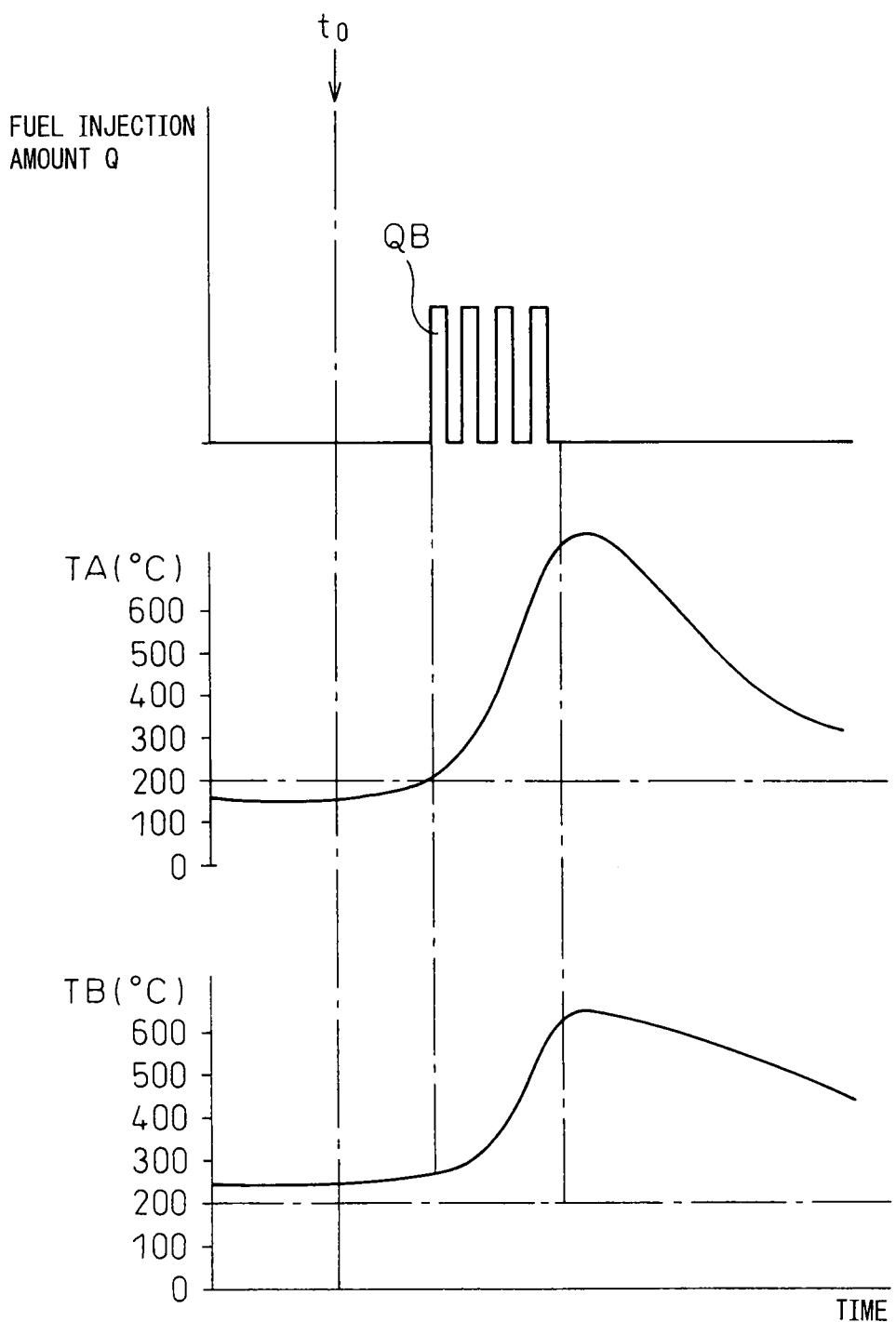
FIG. 6 is a time chart showing control of feed of a second amount QB of fuel from a fuel feed valve.
Figure 7:
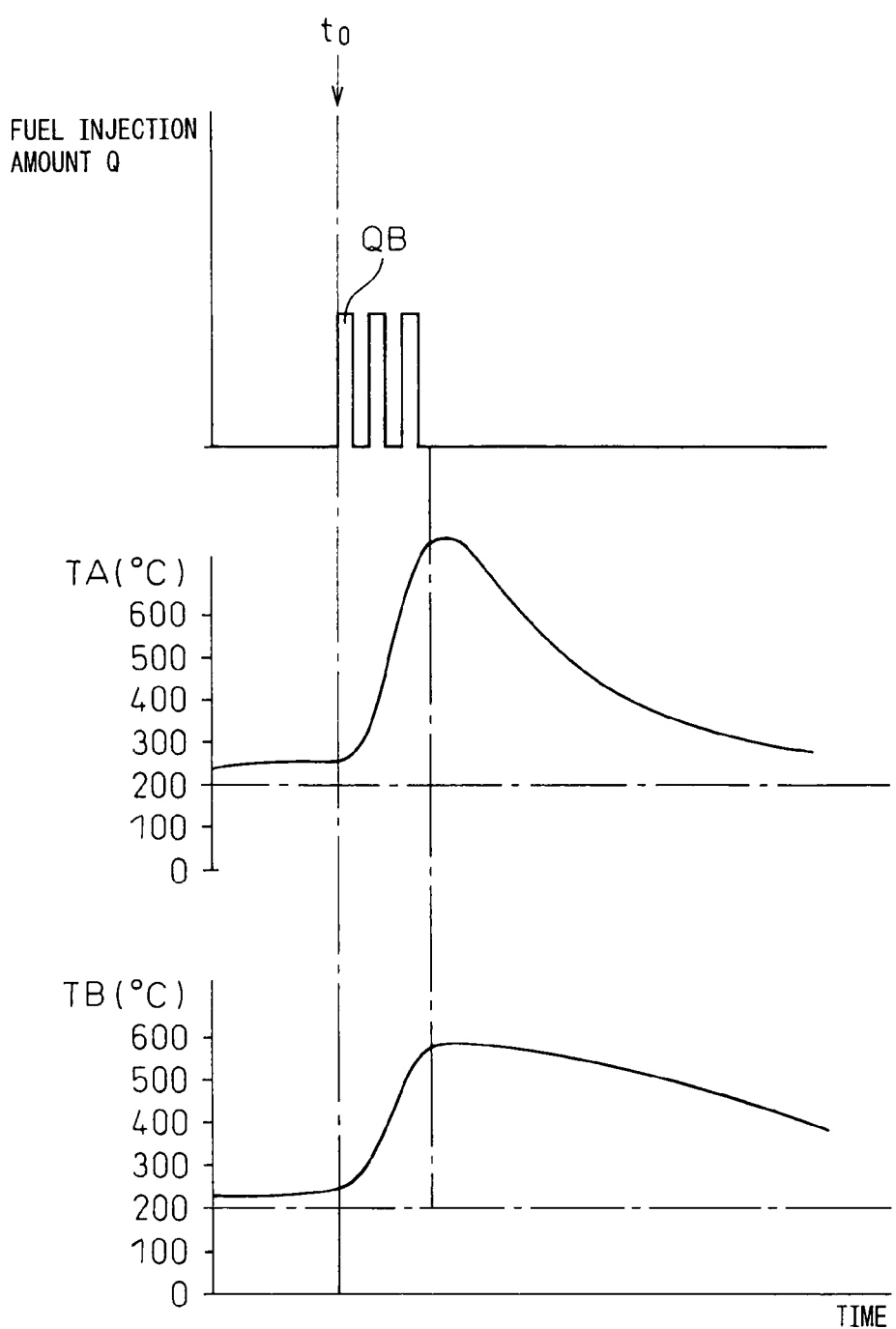
FIG. 7 is a time chart showing control of feed of a second amount QB of fuel from a fuel feed valve.

FIG. 6 and FIG. 7 show the case of raising the temperature of the exhaust purification catalyst 13 when the exhaust purification catalyst 13 is activated. Note that, in this case, the timing $t_0$ at FIG. 6 and FIG. 7 shows when an instruction is issued for raising the temperature of the exhaust purification catalyst 13.

FIG. 6 shows the case where the small-sized oxidation catalyst 14 is not activated at the timing $t_0$. In this case, if the small-sized oxidation catalyst 14 is activated, the feed of the second amount QB of fuel is started. As opposed to this, FIG. 7 shows the case where the small-sized oxidation catalyst 14 is activated at the timing $t_0$. In this case, the feed of the second amount QB of fuel is immediately started.

Figure 8:
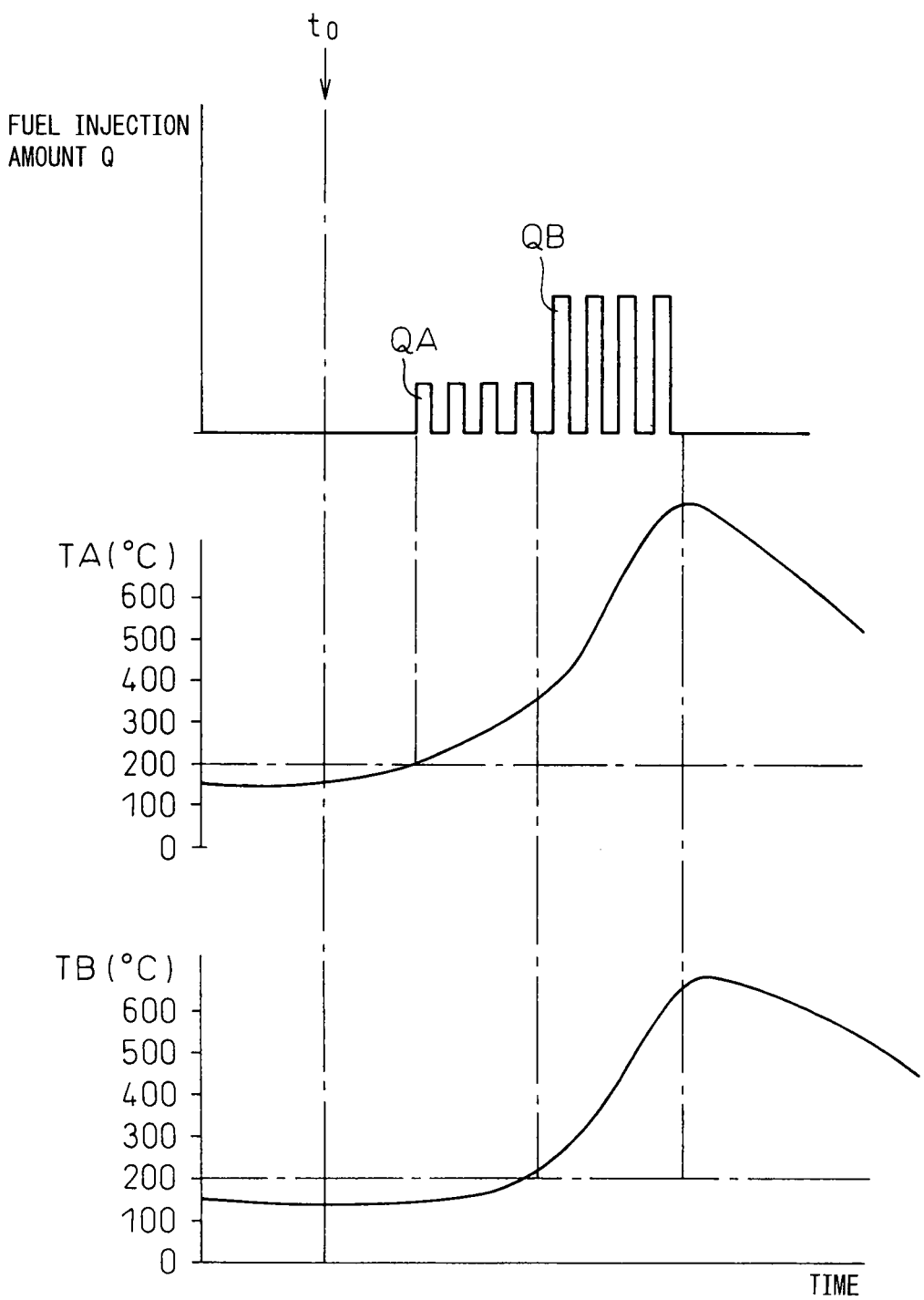
FIG. 8 is a time chart showing control of feed of a second amount QB of fuel from a fuel feed valve.
Figure 9:
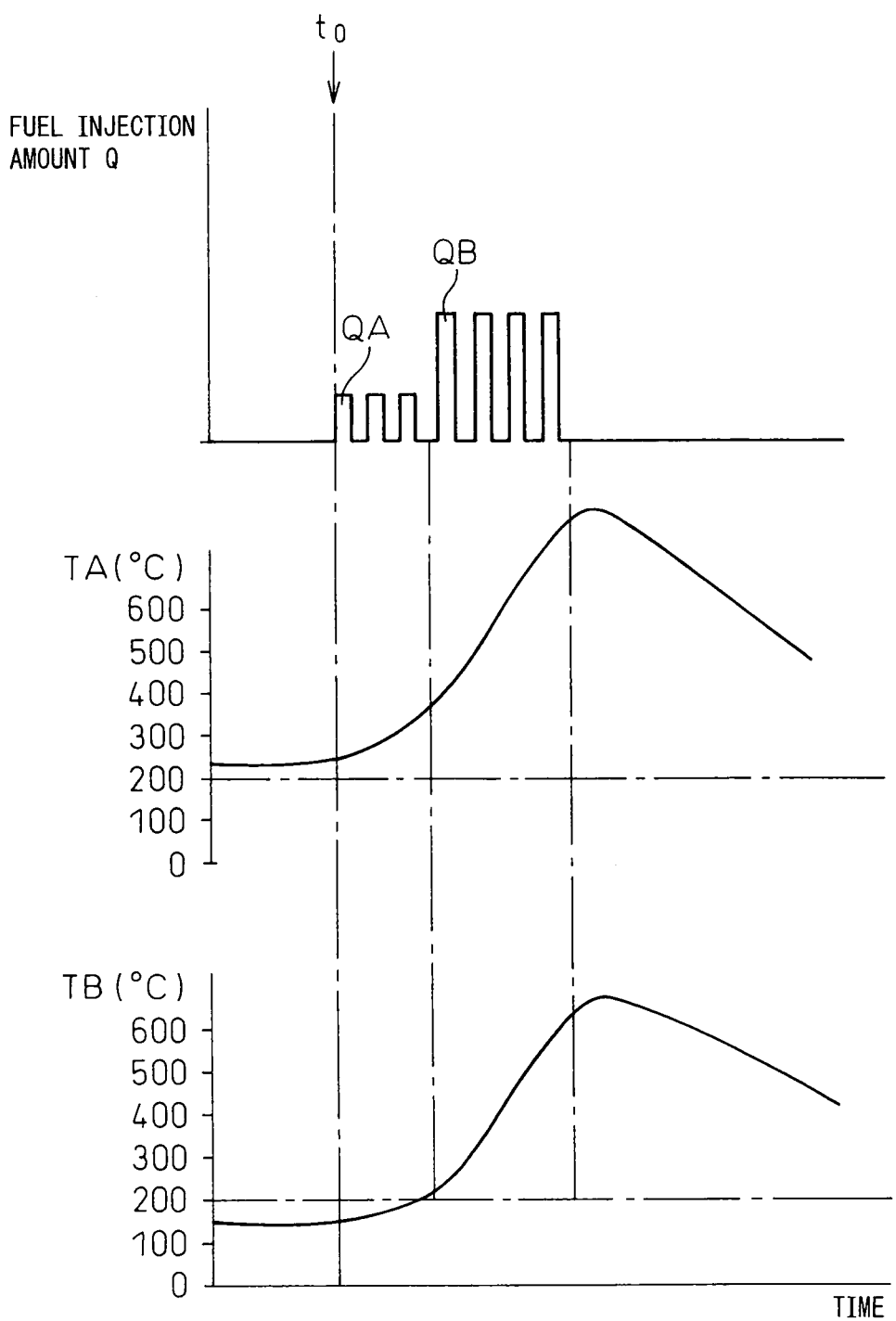
FIG. 9 is a time chart showing control of feed of a second amount QB of fuel from a fuel feed valve.

FIG. 8 and FIG. 9 shows the case where when the exhaust purification catalyst 13 is not activated, at the timing $t_0$, a command is issued for raising the temperature of the exhaust purification catalyst 13. In this case, as shown in FIG. 8 and FIG. 9, the first amount QA is fed so as to make the small-sized oxidation catalyst 14 generate heat and thereby activate the exhaust purification catalyst 13, then the second amount QB of fuel starts to be fed. However, as shown in FIG. 8, when the small-sized oxidation catalyst 14 is not activated at the timing $t_0$, the activation of the small-sized oxidation catalyst 14 is awaited, then the first amount QA of fuel starts to be fed.

As shown from FIG. 6 to FIG. 9, when the second amount QB of fuel starts to be fed, the temperature TB of the exhaust purification catalyst 13 rapidly rises. When the temperature TB of the exhaust purification catalyst 13 reaches the targeted temperature, the feed of the second amount QB of fuel is stopped.

Figure 10:
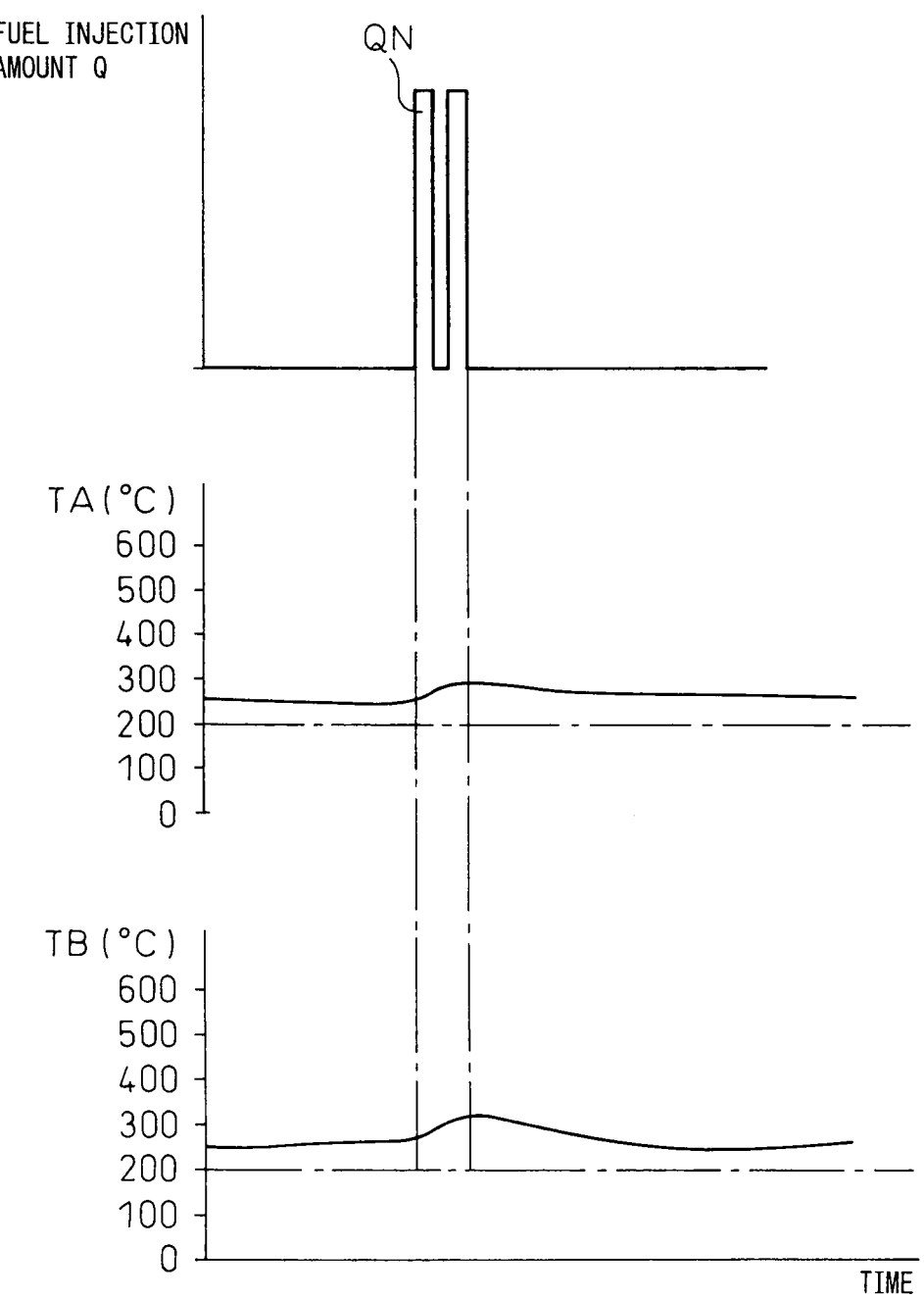
FIG. 10 is a time chart showing control of feed of a third amount QN of fuel from a fuel feed valve.

FIG. 10 shows the case when making the air-fuel ratio of the exhaust gas flowing into the $NO_x$ storage catalyst 17 rich so as to make the $NO_x$ storage catalyst 17 release $NO_x$. At this time, the fuel feed valve 15 feeds a third amount QN of fuel of an amount of feed per unit time greater than the first amount QA and the second amount QB. Note that, the feed of this third amount QN of fuel is the same as the feed of the second amount QB of fuel shown from FIG. 6 to FIG. 9 and is performed when the small-sized oxidation catalyst 14 and exhaust purification catalyst 13 are both activated.

On the other hand, as explained above, when raising the temperature of the $NO_x$ storage catalyst 17 to the $SO_x$ release temperature, the second amount QB of fuel greater than the first amount QA is fed. FIG. 11 shows the case where the temperature of the $NO_x$ storage catalyst 17 is made to rise to the $SO_x$ release temperature, then the $NO_x$ storage catalyst 17 is made to release $SO_x$ by maintaining the temperature of the $NO_x$ storage catalyst 17 at the $SO_x$ release temperature while making the air-fuel ratio of the exhaust gas flowing into the $NO_x$ storage catalyst 17 rich. In this case, a fourth amount QS of fuel of an amount of feed per unit time greater than the second amount QB is intermittently fed from the fuel feed valve 15 until the processing for release of $SO_x$ is completed.

Note that, in this embodiment according to the present invention, the first amount QA, the second amount QB, the third amount QN, and the fourth amount QS, as shown in FIGS. 12(A) to (D), are stored as functions of the demanded torque TQ and engine speed N of the engine in the forms of maps in advance in the ROM 32.

Figure 13:
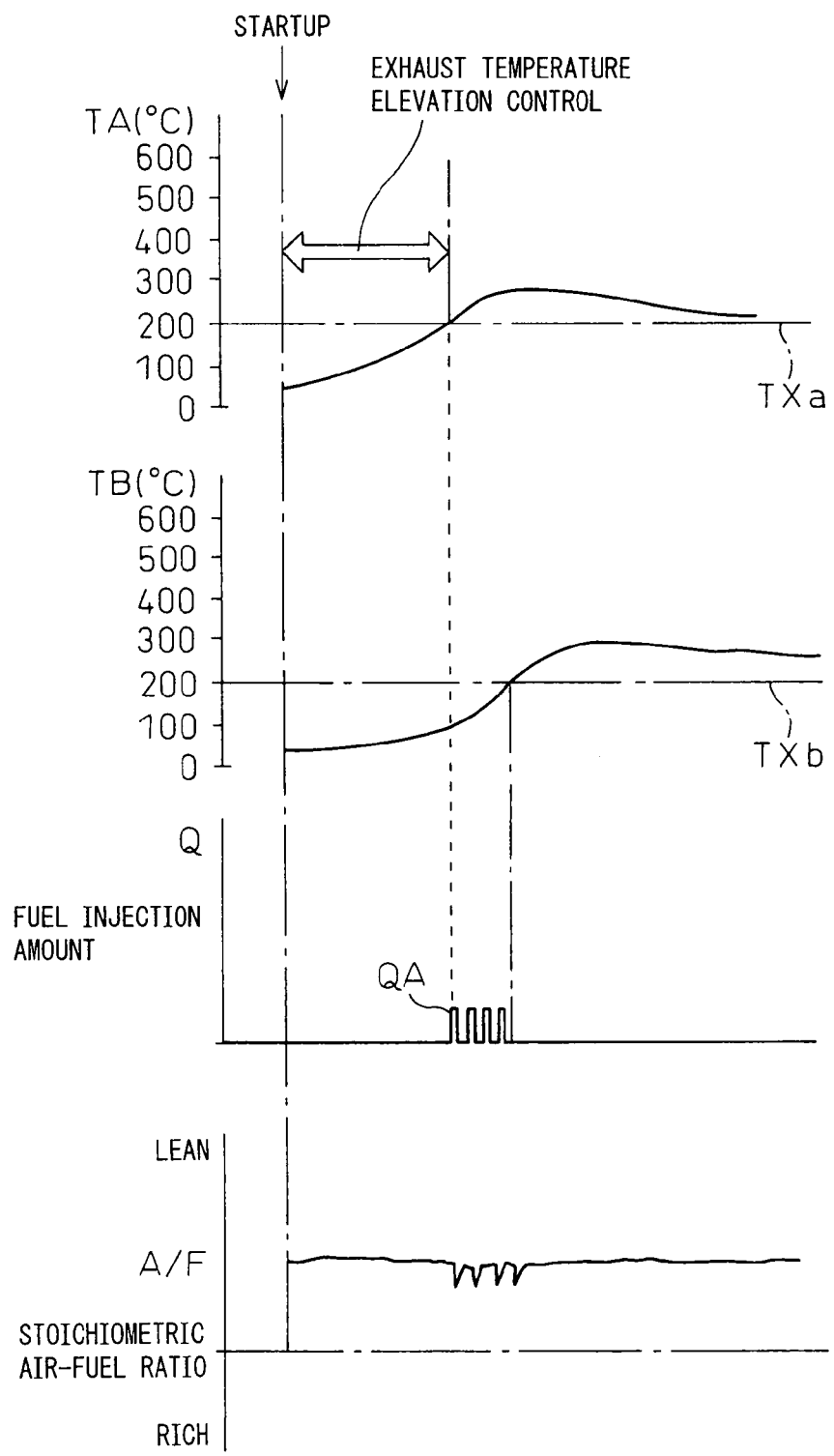
FIG. 13 is a time chart showing control of activation of a catalyst.

FIG. 13 shows an example of catalyst activation control at the time of engine startup. This FIG. 13 also is shown taking as an example the case where the temperature TXa for activation of the small-sized oxidation catalyst 14 is 200° C. and the temperature TXb for activation of the exhaust purification catalyst 13 is 200° C. Note that, FIG. 13 shows the change of the air-fuel ratio A/F of the exhaust gas flowing into the exhaust purification catalyst 13.

In the example shown in FIG. 13, when the engine is started up, if the small-sized oxidation catalyst 14 is not activated, the temperature of the exhaust gas is made to rise until the small-sized oxidation catalyst 14 is activated in exhaust temperature elevation control. When the small-sized oxidation catalyst 14 is activated, the first amount QA of fuel is fed from the fuel feed valve 15 until the exhaust purification catalyst 13 is activated. This exhaust temperature elevation control is for example performed by retarding the timing of fuel injection into the combustion chamber 2.

Such exhaust temperature elevation control is performed when the exhaust purification catalyst 13 changes from an active state to a non-active state during engine operation. That is, in this embodiment according to the present invention, when the exhaust purification catalyst 13 should be activated, if the small-sized oxidation catalyst 14 is not activated, the temperature of the exhaust gas discharged from the combustion chamber 2 is made to rise until the small-sized oxidation catalyst 14 is activated in exhaust temperature elevation control. Note that, this exhaust temperature elevation control is preferably performed, but does not necessarily have to be performed.

Figure 14:
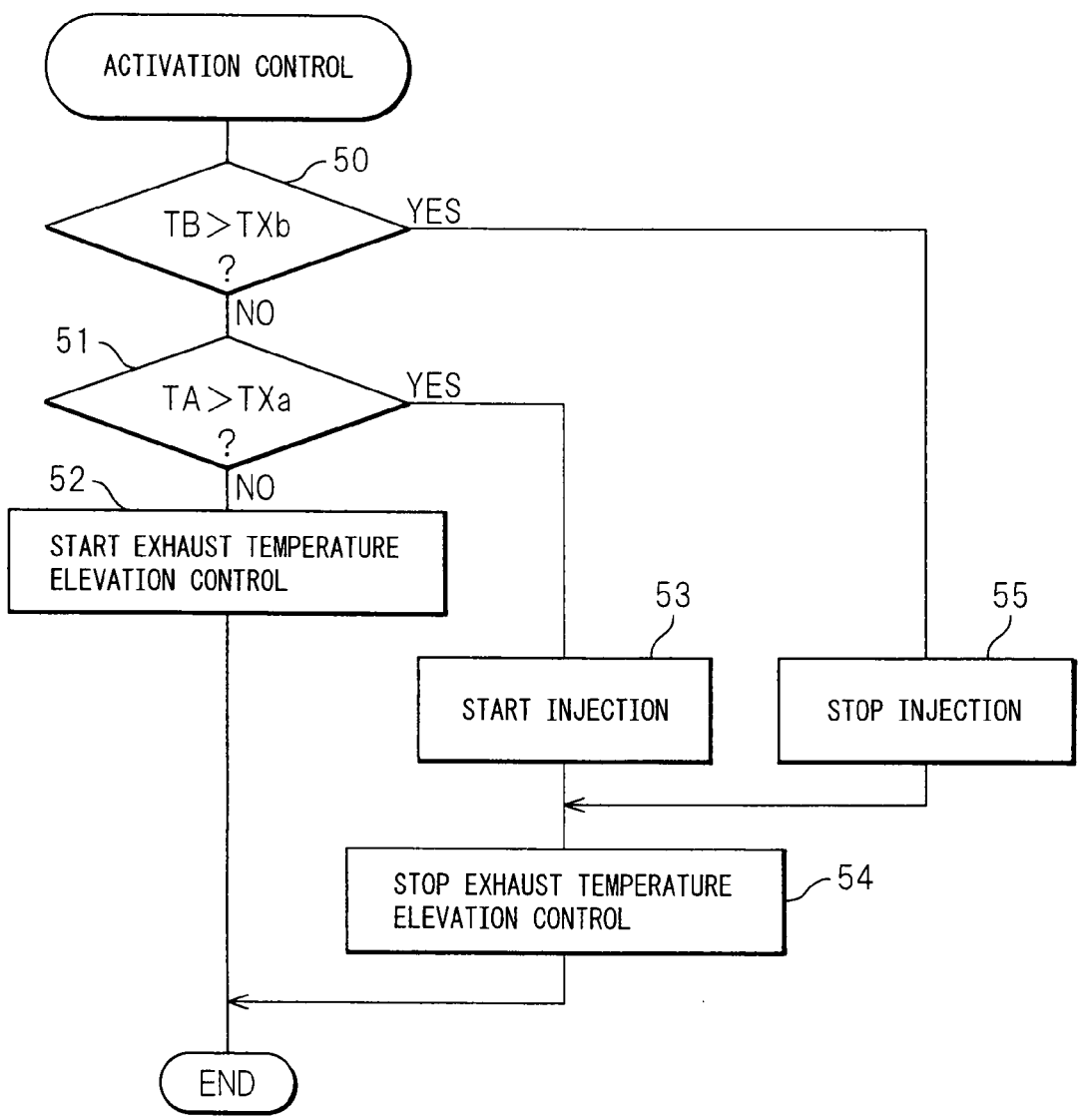
FIG. 14 is a flow chart for execution of control for activation of a catalyst.

FIG. 14 shows a control routine for activation of a catalyst. This routine is executed by interruption every constant time interval.

Referring to FIG. 14, first of all, at step 50, it is determined if the temperature TB of the exhaust purification catalyst 13 is higher than the TXb shown in FIG. 13, that is, if the exhaust purification catalyst 13 is activated or not. When the exhaust purification catalyst 13 is not activated, the routine proceeds to step 51 where it is determined if the temperature TA of the small-sized oxidation catalyst 14 is higher than the TXa shown in FIG. 13, that is, if the small-sized oxidation catalyst 14 is activated. When the small-sized oxidation catalyst 14 is not activated, the routine proceeds to step 52 where the exhaust temperature elevation control is started.

Next, if it is judged at step 51 that the small-sized oxidation catalyst 14 is activated, the routine proceeds to step 53 where injection of the first amount QA of fuel from the fuel feed valve 15 is started. Next, at step 54, the exhaust temperature elevation control is stopped. On the other hand, when it is judged at step 50 that the exhaust purification catalyst 13 is activated, the routine proceeds to step 55 where the injection of the first amount Q of fuel is stopped. Next, the routine proceeds to step 54.

Next, referring to FIG. 15 to FIG. 18, the exhaust purification processing will be explained.

Figure 15:
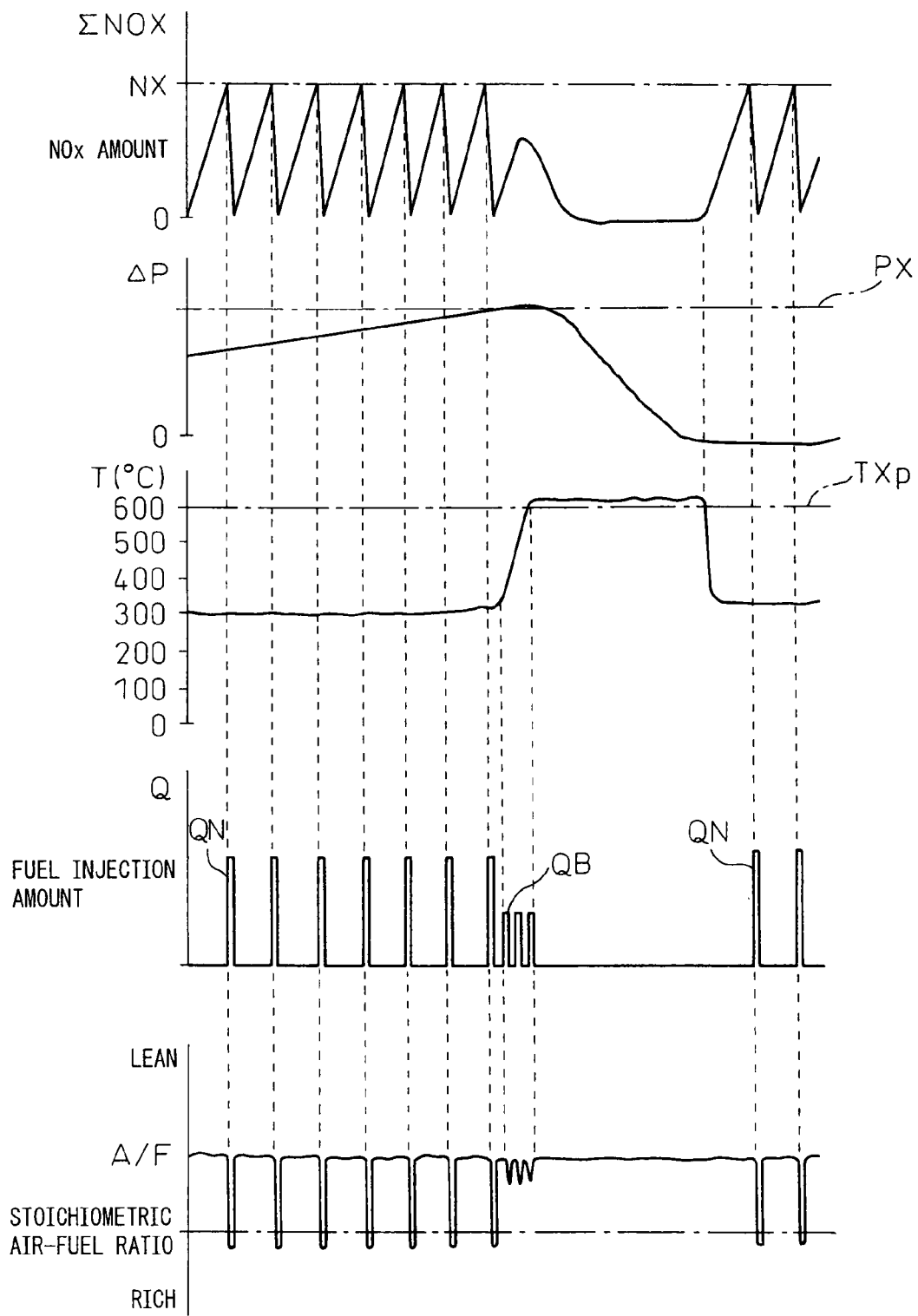
FIG. 15 is a time chart showing $NO_x$ release control and temperature elevation control of a particulate filter.

In this embodiment according to the present invention, the NOx amount NOXA stored per unit time in the $NO_x$ storage catalyst 17 is stored as a function of the required torque TQ and engine speed N in the form of the map shown in FIG. 17(A) in advance in the ROM 32. By cumulatively adding this NOx amount NOXA, the NOx amount ΣNOX stored in the $NO_x$ storage catalyst 17 is calculated. In this embodiment according to the present invention, as shown in FIG. 15, each time this NOx amount ΣNOX reaches the allowable value NX, the third amount QN of fuel is fed from the fuel feed valve 15. At this time, the air-fuel ratio A/F of the exhaust gas flowing into the $NO_x$ storage catalyst 17 is temporarily made rich, whereby $NO_x$ is released from the $NO_x$ storage catalyst 17.

On the other hand, the particulate contained in the exhaust gas, that is, the particulate matter, is trapped on the particulate filter 16 and successively oxidized. However, if the amount of the particulate matter which is trapped becomes larger than the amount of the particulate matter which can be oxidized, particulate matter will gradually build up on the particulate filter 16. In this case, if the amount of particulate matter built up increases, it will end up leading to a drop in the engine output. Therefore, when the amount of deposition of particulate matter increases, the deposited particulate matter has to be removed. In this case, if making the temperature of the particulate filter 16 rise to 600° C. or so in an excess of air, the deposited particulate matter is removed by oxidation.

Therefore, in this embodiment according to the present invention, when the amount of the particulate matter deposited on the particulate filter 16 exceeds an allowable amount, the temperature of the particulate filter 16 is raised under a lean air-fuel ratio of the exhaust gas. Due to this, the deposited particulate matter is removed by oxidation. Specifically, in this embodiment according to the present invention, when a differential pressure ΔP before and after the particulate filter 16 detected by the differential sensor 28, as shown in FIG. 15, exceeds an allowable value PX, it is judged that the cumulative amount of the particulate matter has exceeded an allowable amount. At this time, the second amount QB of fuel is injected from the fuel feed valve 15. As a result, the air-fuel ratio of the exhaust gas flowing into the particulate filter 16 is kept lean while the temperature T of the particulate filter 16 is raised. Note that if the temperature T of the particulate filter 16 becomes higher, $NO_x$ is released from the $NO_x$ storage catalyst 17, so the NOx amount ΣNOX trapped is reduced.

Figure 16:
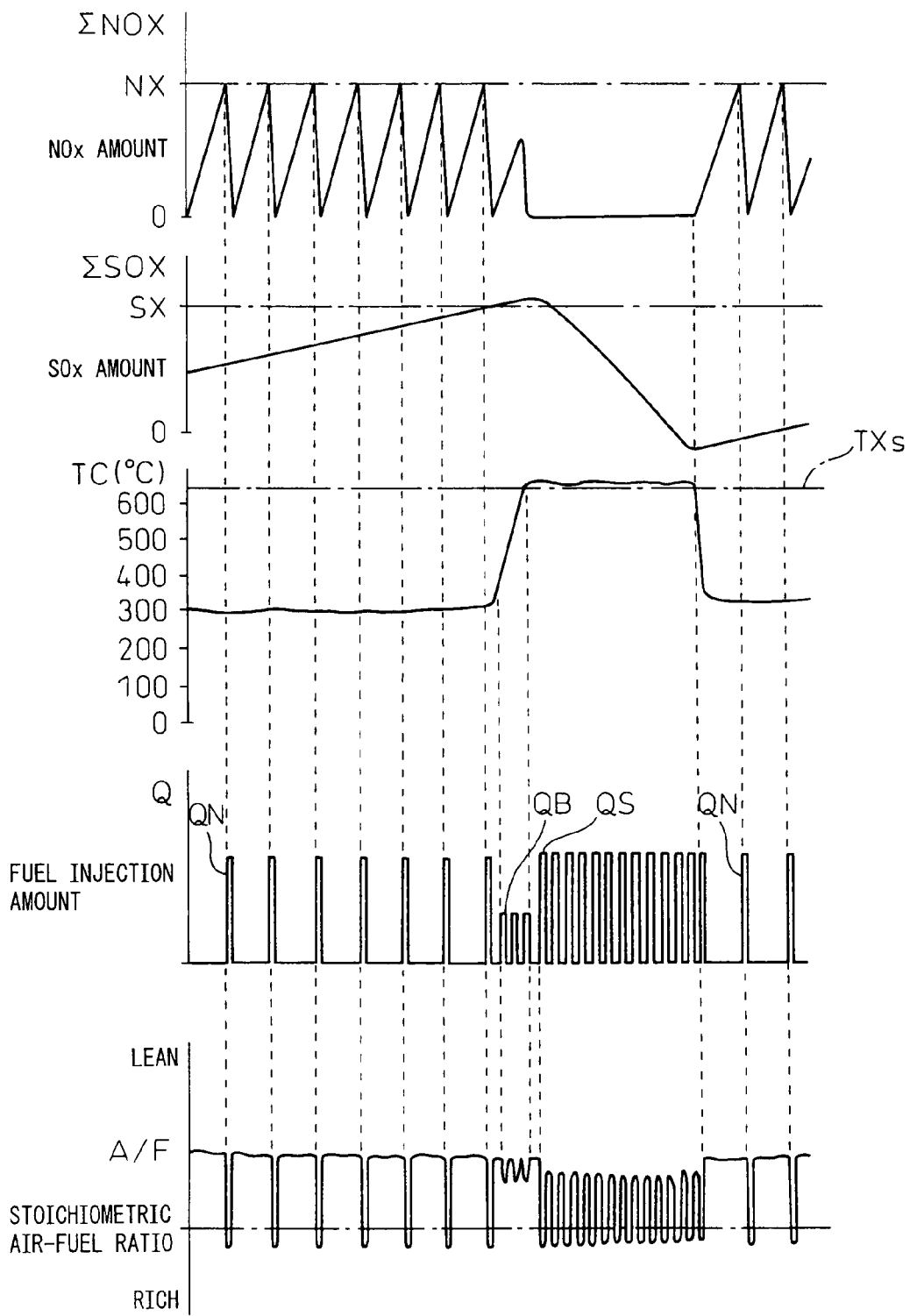
FIG. 16 is a time chart showing $NO_x$ release control and $SO_x$ release control, FIG. 17 are views showing maps of the stored $NO_x$ amount NOXA and stored $SO_x$ amount SOXZ.

On the other hand, as explained above, to make the $NO_x$ storage catalyst 17 release $SO_x$, the temperature of the $NO_x$ storage catalyst 17 has to be made to rise to the $SO_x$ release temperature and the air-fuel ratio of the exhaust gas sent to the $NO_x$ storage catalyst 17 has to be made rich. Therefore, in this embodiment according to the present invention, as shown in FIG. 16, when the $SO_x$ amount $\Sigma SOX$ stored in the $NO_x$ storage catalyst 17 reaches the allowable value SX, the second amount QN of fuel is injected from the fuel feed valve 15 whereby the temperature TC of the $NO_x$ storage catalyst 17 can be raised to the $NO_x$ release temperature TXs. Next, the fourth amount QS of fuel is injected from the fuel feed valve 15 whereby the temperature TC of the $NO_x$ storage catalyst 17 is maintained at the $SO_x$ release temperature TXs while the air-fuel ratio of the exhaust gas flowing into the $NO_x$ storage catalyst 17 is made rich.

Note that, the $SO_x$ amount SOXZ stored in the $NO_x$ storage catalyst 17 per unit time is stored as a function of the required torque TQ and engine speed N in the form of a map such as shown in FIG. 17(B) in advance in the ROM 32. By cumulatively adding this $SO_x$ amount SOXZ, the stored $SO_x$ amount $\Sigma SOX$ is calculated.

Figure 18:
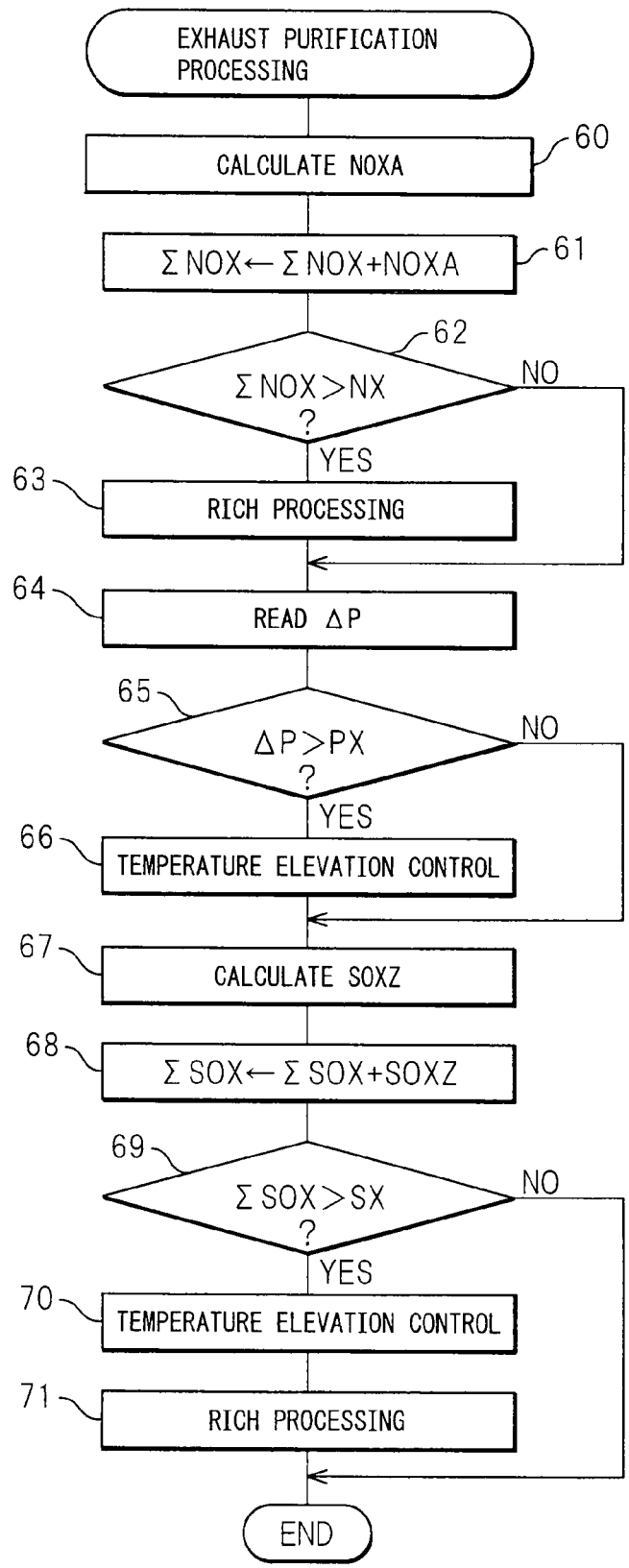
FIG. 18 is a flow chart of execution of exhaust purification processing.

FIG. 18 shows an exhaust purification processing routine. This routine is also executed by interruption every predetermined time interval.

Referring to FIG. 18, first of all, at step 60, the NOx amount NOXA stored per unit time is calculated from the map shown in FIG. 17(A). Next, at step 61, this NOXA is added to the NOx amount $\Sigma NOX$ stored in the $NO_x$ storage catalyst 17. Next, at step 62, it is determined if the stored NOx amount $\Sigma NOX$ exceeds the allowable value NX. When $\Sigma NOX>NX$, the routine proceeds to step 63 where rich processing is performed to temporarily switch the air-fuel ratio of the exhaust gas sent into the $NO_x$ storage catalyst from lean to rich, that is, processing is performed to inject the third amount QN of fuel from the fuel feed valve 15, and $\Sigma NOX$ is cleared.

Next, at step 64, the differential sensor 28 is used to detect the differential pressure $\Delta P$ before and after the particulate filter 16. Next, at step 65, it is determined if the differential pressure $\Delta P$ has exceeded the allowable value PX. When $\Delta P>PX$, the routine proceeds to step 66 where temperature elevation control of the particulate filter 16 is performed. This temperature elevation control is performed by maintaining the air-fuel ratio of the exhaust gas flowing into the particulate filter 16 lean while feeding the second amount QB of fuel from the fuel feed valve 15.

Next, at step 67, the $SO_x$ amount SOXZ stored per unit time is calculated from the map shown in FIG. 17(B). Next, at step 68, this SOXZ is added to the $SO_x$ amount $\Sigma SOX$ stored in the $NO_x$ storage catalyst 17. Next, at step 69, it is determined if the stored $SO_x$ amount $\Sigma SOX$ has exceeded the allowable value SX. When $\Sigma SOX>SX$, the routine proceeds to step 70 where temperature elevation control is performed to raise the temperature TC of the $NO_x$ storage catalyst 17 to the $SO_x$ release temperature TXs, that is, processing is performed to feed the second amount QB of fuel from the fuel feed valve 15. Next, at step 71, rich processing is performed to maintain the air-fuel ratio of the exhaust gas sent into the $NO_x$ storage catalyst 17 rich, that is, processing is performed to inject the fourth amount Q of fuel from the fuel feed valve 15, and $\Sigma SOX$ is cleared.

Next, a second embodiment according to the present invention will be explained.

Figure 19:
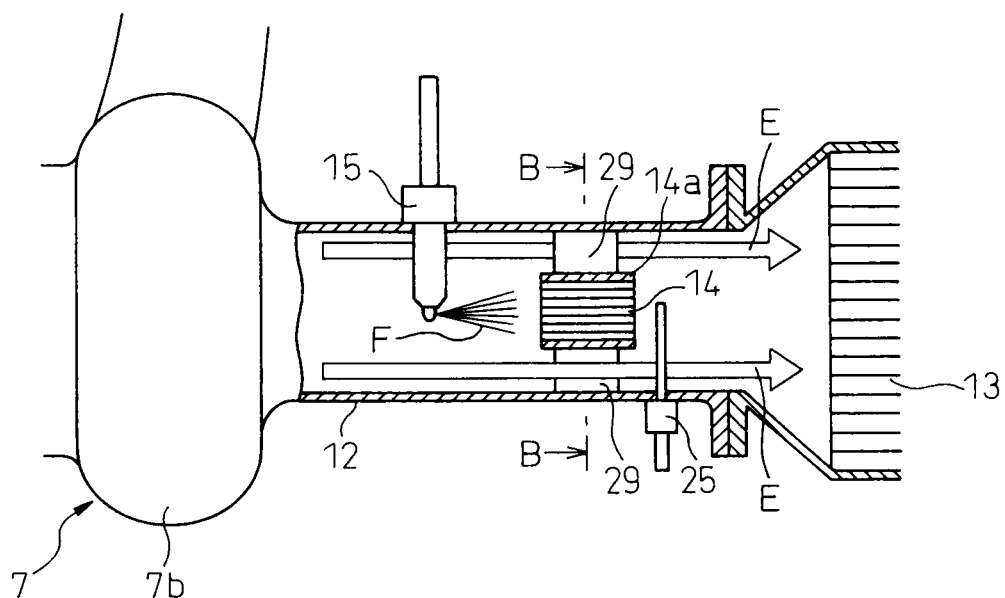
FIG. 19 is a view showing an enlarged view of the vicinity of a small-sized oxidation catalyst.

As explained above, the second amount QB injected from the fuel injector 15 is considerably greater than the first amount QA. Therefore if the second amount QB of fuel is fed from the fuel injector 15, the exhaust purification catalyst 13 can be rapidly made to rise in temperature. However, in this case, depending on the size of the exhaust purification catalyst 13, the temperature of the exhaust purification catalyst 13 will not rise to the 600° C. or higher target temperature in some cases. Therefore, in this second embodiment, in such a case, the temperature of the exhaust gas discharged from the fuel chamber 2 is made to rise or the amount of unburned HC discharged from the combustion chamber 2 and, as shown by the arrow E of FIG. 19, flowing into the exhaust purification catalyst 13 is made to increase.

That is, if making the temperature of the exhaust gas discharged from the combustion chamber 2 rise, the exhaust purification catalyst 13 rises in temperature and therefore the temperature of the exhaust purification catalyst 13 can be made to rise to the targeted temperature. In this case, in this second embodiment, for example, the injection timing of the fuel injected from the fuel injector 3 to the inside of the combustion chamber 2 is retarded whereby the temperature of the exhaust gas discharged from the combustion chamber 2 can be made to rise. The retardation amount θR of the fuel injection timing at this time is stored as a function of the required torque TQ and engine speed N in the form of a map such as shown in FIG. 21(A) in advance in the ROM 32.

In this regard, in this way, when making the temperature of the exhaust gas discharged from the combustion chamber 2 rise, if the small-sized oxidation catalyst 14 becomes extremely high in temperature, the small-sized oxidation catalyst 14 will be degraded by the heat. Therefore, in this second embodiment, when making the temperature of the exhaust gas discharged from the combustion chamber 2 rise, when the temperature of the small-sized oxidation catalyst 14 reaches a predetermined allowable temperature, that is, when there is a danger of heat degradation occurring, the amount of feed of fuel from the fuel feed valve 15 is made to fall and the temperature of the exhaust gas discharged from the combustion chamber 2 is made to further rise.

In this way, by making the amount of feed of fuel from the fuel feed valve 15 fall and making the temperature of the exhaust gas discharged from the combustion chamber 2 further rise, the temperature of the exhaust purification catalyst 13 can be made to rise to the targeted temperature and heat degradation of the small-sized oxidation catalyst 14 can be prevented.

On the other hand, if making the amount of unburned HC discharged from the combustion chamber 2 increase, due to the heat of oxidation reaction of the unburned HC generated at the exhaust purification catalyst 13, the exhaust purification catalyst 13 rises in temperature and therefore the temperature of the exhaust purification catalyst 13 can be made to rise to the targeted temperature. In this case, in this second embodiment, the fuel injector 3 feeds additional fuel into the combustion chamber 2 in the latter half of the expansion stroke or during the exhaust stroke, that is, during the period shown by the broken line J in FIG. 20, whereby the amount of unburned HC discharged from the combustion chamber 2 is made to increase.

Figure 20:
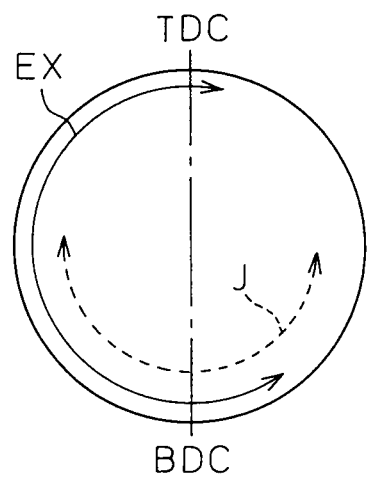
FIG. 20 is a view showing the injection timing of additional fuel, FIG. 21 are views of maps of a retardation amount θR and additional amounts of fuel QPB, QPN, and QPS.

Note that, in FIG. 20, BDC shows exhaust bottom dead center, TDC shows suction top dead center, and EX shows the opening period of the exhaust valve. The additional amount of fuel QPB injected during the period shown by the broken line J of FIG. 20 is stored as a function of the required torque TQ and engine speed N in the form of a map such as shown in FIG. 21(B) in advance in the ROM 32.

In this regard, in this way, even when making the amount of unburned HC discharged from the combustion chamber 2 increase and the temperature of the small-sized oxidation catalyst 14 becomes extremely high, the small-sized oxidation catalyst 14 suffers from heat degradation. Therefore, in this second embodiment, when making the amount of unburned HC discharged from the combustion chamber 2 increase, when the temperature of the small-sized oxidation catalyst 14 reaches the predetermined allowable temperature, that is, as explained above, when there is the danger of heat degradation occurring, the amount of feed of fuel from the fuel feed valve 15 is made to decrease and the amount of unburned HC discharged from the combustion chamber 2 is made to further increase.

In this way, by making the amount of feed of fuel from the fuel feed valve 15 decrease and making the amount of unburned HC discharged from the combustion chamber 2 further increase, the temperature of the exhaust purification catalyst 13 can be made to rise to the targeted temperature and the small-sized oxidation catalyst 14 can be prevented from degrading due to heat.

In this second embodiment, as shown in FIG. 6 to FIG. 9, while the second amount QB of fuel is being fed, the temperature of the exhaust gas discharged from the combustion chamber 2 is made to rise or the amount of unburned HC discharged from the combustion chamber 2 is made to increase. As a result, the temperature TB of the exhaust purification catalyst 13 rapidly rises. Next, when the temperature TB of the exhaust purification catalyst 13 reaches the targeted temperature, the feed of the second amount QB of fuel is stopped.

Further, in this second embodiment, when using the reformed fuel flowing out from the small-sized oxidation catalyst 14 to make the $NO_x$ storage catalyst 17 release $NO_x$, that is, when using the reformed fuel flowing out from the small-sized oxidation catalyst 14 to perform exhaust purification processing at the exhaust purification catalyst 13, the amount of unburned HC discharged from the combustion chamber 2 is made to increase. If the amount of unburned HC discharged from the combustion chamber 2 is made to increase, the oxygen contained in the exhaust gas will be used for oxidation of the unburned HC and therefore the air-fuel ratio of the exhaust gas will become low in degree of leanness.

If the air-fuel ratio of the exhaust gas becomes low in degree of leanness, even if the amount of the reformed fuel flowing out from the small-sized oxidation catalyst 14 is not that great, the air-fuel ratio of the exhaust gas flowing into the $NO_x$ storage catalyst 17 will become rich and therefore the $NO_x$ storage catalyst 17 can release $NO_x$ well. Note that, at this time, to increase the discharged amount of unburned HC, the additional fuel QPN injected during the period shown by the broken line J of FIG. 2 is stored as a function of the required torque TQ and engine speed N in the form of a map such as shown in FIG. 21(C) in advance in the ROM 32.

Furthermore, in this second embodiment, in this way, when the reformed fuel flowing out from the small-sized oxidation catalyst 14 is used to make the $NO_x$ storage catalyst 17 release $SO_x$, that is, when the reformed fuel flowing out from the small-sized oxidation catalyst 14 is used to enable the exhaust purification catalyst 13 to perform exhaust purification processing, the amount of unburned HC discharged from the combustion chamber 2 is made to increase. If the amount of unburned HC discharged from the combustion chamber 2 is made to increase, as explained above, the air-fuel ratio of the exhaust gas becomes low in degree of leanness.

If the degree of leanness of the air-fuel ratio of the exhaust gas becomes low, even when the amount of the reformed fuel flowing out from the small-sized oxidation catalyst 14 is not that great, the air-fuel ratio of the exhaust gas flowing into the $NO_x$ storage catalyst 17 becomes rich and therefore the $NO_x$ storage catalyst 17 can release $SO_x$ well. Note that, the additional fuel QPS injected during the period shown by the broken line J of FIG. 20 so as to increase the discharged amount of unburned HC at this time is stored as a function of the required torque TQ and engine speed N in the form of a map such as shown in FIG. 21(D) in advance in the ROM 32.

In this second embodiment as well, the exhaust purification processing routine shown in FIG. 18 is used. Note that, FIG. 22 shows an embodiment of temperature elevation control performed at step 66 and step 70 of FIG. 18.

Figure 22:
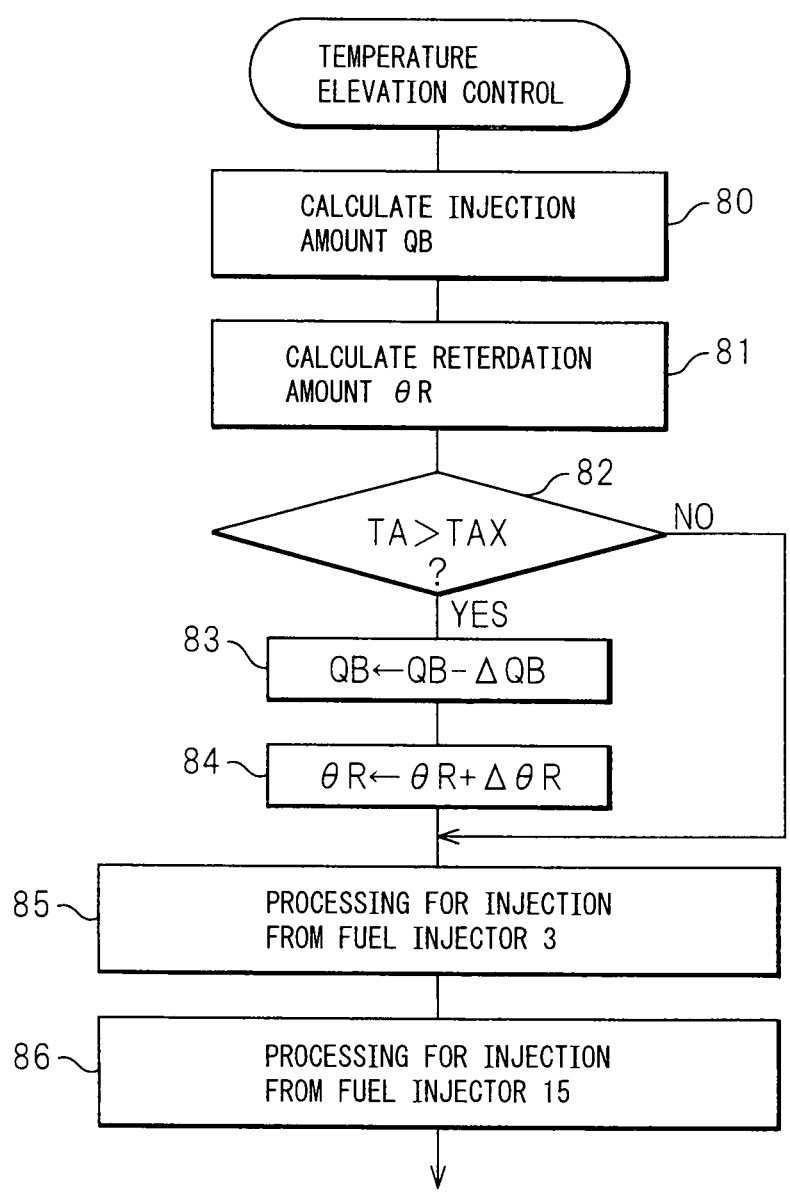
FIG. 22 is a flow chart for temperature elevation control.

Referring to FIG. 22, first of all, at step 80, the second injected fuel amount QB injected from the fuel feed valve 15 is calculated, then at the next step 81, the retardation amount θR of the fuel injection timing of the fuel injector 3 is calculated. Next, at step 82, it is determined whether the temperature TA of the small-sized oxidation catalyst 14 is higher than the predetermined allowable temperature TAX. When TA≦TAX, the routine jumps to step 85.

At step 85, fuel is injected from the fuel injector 3 based on the calculated retardation amount θR. At this time, the temperature of the exhaust gas can be raised. Next, at step 86, fuel is injected from the fuel feed valve 15 based on the calculated injected fuel amount QB. On the other hand, when it is determined at step 82 that TA>TAX, the routine proceeds to step 83 where the injected fuel amount QB is reduced by a predetermined amount ΔQB. Next, at step 84, the retardation amount θR of the injection timing is increased by a predetermined retardation amount ΔθR, then the routine proceeds to the next step 85. Therefore, at this time, the amount of injection from the fuel feed valve 15 can be reduced and the temperature of the exhaust gas can be further raised.

Figure 23:
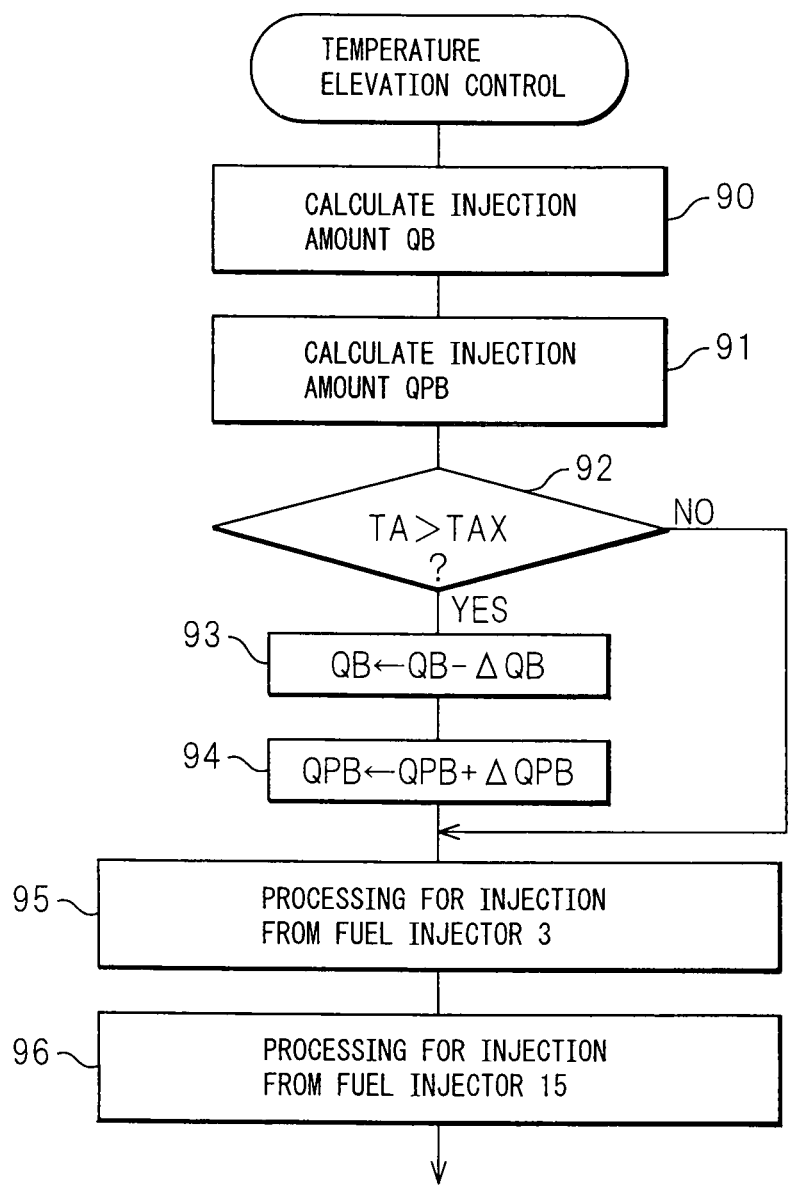
FIG. 23 is a flow chart for temperature elevation control.

FIG. 23 shows another embodiment of the temperature elevation control performed at step 66 and step 70 of FIG. 18.

Referring to FIG. 23, first of all, at step 90, the second injected fuel amount QB injected from the fuel feed valve 15 is calculated, then, at the next step 91, the additional amount of fuel QPB injected from the fuel injector 3 is calculated. Next, at step 92, it is determined if the temperature TA of the small-sized oxidation catalyst 14 is higher than a predetermined allowable temperature TAX. When TA≦TAX, the routine jumps to step 95.

At step 95, fuel is injected from the fuel injector 3 based on the calculated additional amount of fuel QPB. At this time, the discharged amount of unburned HC is made to increase. Next, at step 96, fuel is injected from the fuel feed valve 15 based on the calculated injected fuel amount QB. On the other hand, when it is determined at step 92 that TA>TAX, the routine proceeds to step 93 where the injected fuel amount QB is reduced by a predetermined amount ΔQB. Next, at step 94, the additional injection amount QPB is increased by a predetermined amount ΔQPB, then the routine proceeds to the next step 95. Therefore, at this time, the amount of injection from the fuel feed valve 15 can be reduced and the amount of HC discharged from the combustion chamber 2 can be increased.

Figure 24:
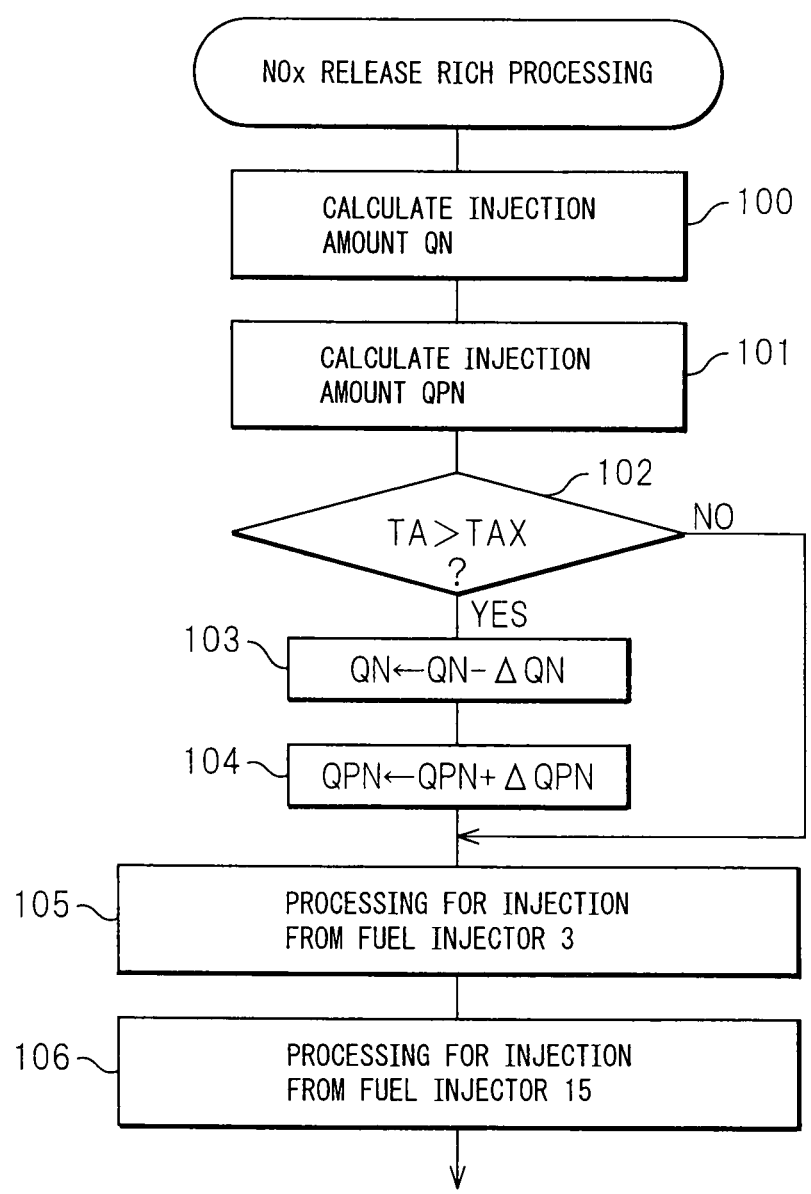
FIG. 24 is a flow chart for rich processing for release of $NO_x$.

FIG. 24 shows an embodiment of the rich control performed at step 63 of FIG. 18.

Referring to FIG. 24, first of all, at step 100, the third injected fuel amount QN injected from the fuel feed valve 15 is calculated, while at the next step 101, the additional amount of fuel QPN injected from the fuel injector 3 is calculated. Next, at step 102, it is determined whether the temperature TA of the small-sized oxidation catalyst 14 is higher than the predetermined allowable temperature TAX. When TA≦TAX, the routine jumps to step 105.

At step 105, fuel is injected from the fuel injector 3 based on the calculated additional amount QPN of fuel. At this time, the discharged amount of unburned HC is made to increase. Next, at step 106, fuel is injected from the fuel feed valve 15 based on the calculated injected fuel amount QN. On the other hand, when it is determined at step 102 that TA>TAX, the routine proceeds to step 103 where the injected fuel amount QN is reduced by a predetermined amount ΔQN. Next, at step 104, the additional injection amount QPN is increased by a predetermined amount ΔQPN, then the routine proceeds to the next step 105. Therefore, at this time, the amount of injection from the fuel feed valve 15 can be reduced and amount of HC discharged from the combustion chamber 2 can be increased.

Figure 25:
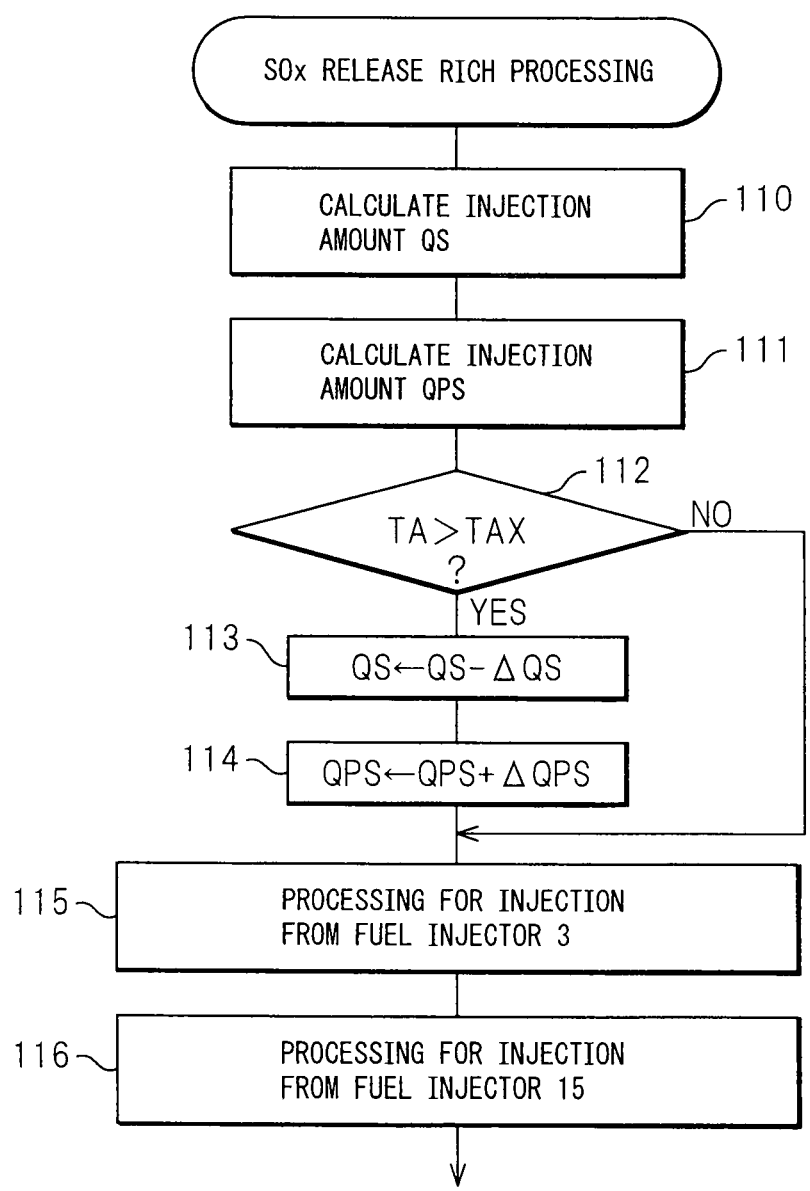
FIG. 25 is a flow chart for rich processing for release of $SO_x$, FIG. 26 are enlarged views of a vicinity of a small-sized oxidation catalyst, FIG. 27 are views showing a modification of a small-sized oxidation catalyst.

FIG. 25 shows an embodiment of the rich control performed at step 71 of FIG. 18.

Referring to FIG. 25, first of all, at step 110, the fourth amount of injected fuel QS injected from the fuel feed valve 15 is calculated, while at the next step 111, the additional amount of fuel QPS injected from the fuel injector 3 is calculated. Next, at step 112, it is determined if the temperature TA of the small-sized oxidation catalyst 14 is higher than the predetermined allowable temperature TAX. When TA≦TAX, the routine jumps to step 115.

At step 115, fuel is injected from the fuel injector 3 based on the calculated additional amount of fuel QPS. At this time, the amount of discharge of unburned HC is made to increase. Next, at step 116, fuel is injected from the fuel feed valve 15 based on the calculated injected fuel amount QS. On the other hand, when it is determined at step 112 that TA>TAX, the routine proceeds to step 113 where the injected fuel amount QS is reduced by a predetermined amount ΔQS. Next, at step 114, the additional injection amount QPS is increased by a predetermined amount ΔQPS, then the routine proceeds to the next step 115. Therefore, at this time, the amount of injection from the fuel feed valve 15 is made to decrease and the amount of HC discharged from the combustion chamber 2 is made to increase.

In this way, in this second embodiment, when the reformed fuel flowing out from the small-sized oxidation catalyst 14 is used to make the exhaust purification catalyst 13 rise in temperature, by making the temperature of the exhaust gas discharged from the combustion chamber 2 rise, the exhaust purification catalyst 13 can be made to rise in temperature well. When the reformed fuel flowing out from the small-sized oxidation catalyst 14 is used to perform exhaust purification processing in the exhaust purification catalyst 13, by making the amount of unburned HC discharged from the combustion chamber 2 increase, exhaust purification processing can be performed well in the exhaust purification catalyst 13.

Next, a third embodiment according to the present invention will be explained.

As explained above, when making the temperature of the exhaust purification catalyst 13 rise or when performing processing for purification of the exhaust at the exhaust purification catalyst 13, the small-sized oxidation catalyst 14 sends the reformed fuel into the exhaust purification catalyst 13. However, if the small-sized oxidation catalyst 14 sends the reformed fuel into the exhaust purification catalyst 13, at the inlet part of the exhaust purification catalyst 13, that is, the upstream side end of the exhaust purification catalyst 13, a strong oxidation reaction of the reformed fuel occurs. As a result, an extremely large heat of oxidation reaction is produced, so the problem arises that the upstream side end of the exhaust purification catalyst 13 is degraded by heat.

Therefore, in this third embodiment, when feeding fuel from the fuel feed valve 15 to the small-sized oxidation catalyst 14, part of the fed fuel, as shown by the arrow E in FIG. 26, is made to along the sides of the small-sized oxidation catalyst 14 and flow into the exhaust purification catalyst 13 without being allowed to flow to the small-sized oxidation catalyst 14. If, in this way, making part of the fuel fed from the fuel feed valve 15, that is, the diesel oil, flow into the exhaust purification catalyst 13, the upstream side end of the exhaust purification catalyst 13 will have heavy fuel contained in the diesel oil stick to it. The precious metal catalyst etc. carried at the exhaust purification catalyst 13 will end up being covered by this heavy fuel.

As a result, the upstream side end of the exhaust purification catalyst 13 falls in activity, so the oxidation reaction of the upstream side end of the exhaust purification catalyst 13 is suppressed and therefore the upstream side end of the exhaust purification catalyst 13 can be prevented from heat degradation. The heavy fuel stuck to the upstream side end of the exhaust purification catalyst 13 evaporates when the temperature of the exhaust purification catalyst 13 rises, flows inside the exhaust purification catalyst 13 to the downstream side, and can be oxidized in that process.

In the embodiment shown in FIG. 26, part of the fuel F injected from the fuel injector 15 is made to run along the sides of the small-sized oxidation catalyst 14 as shown by the arrows E by making the atomization region of the fuel injected from the fuel feed valve 15 in the plane including the upstream side end face of the small-sized oxidation catalyst 14 wider than the region of this upstream side end face. That is, the injected fuel atomization region is widened outward in the radial direction of the upstream side end face of the small-sized oxidation catalyst 14. If doing this, the peripheral edges of the fuel atomization flow around the small-sized oxidation catalyst 14 toward the exhaust purification system 13.

Note that, even when making the injected fuel strike the upstream side end face of the small-sized oxidation catalyst 14, due to the reflection at the time of impact, a considerable amount of fuel is splattered at the sides of the small-sized oxidation catalyst 14 in some cases. In this case, the total injected fuel can be made to head to the upstream side end face of the small-sized oxidation catalyst 14 by injecting fuel from the fuel injector 15.

FIG. 27 show a modification of a small-sized oxidation catalyst. FIG. 27(B) shows a cross-sectional view along the B-B section of FIG. 27(A). As shown in FIGS. 27(A) and (B), in this modification, the center of the small-sized oxidation catalyst 14 is formed with a through hole 48 for fuel flow extending in the direction of flow of exhaust gas. Fuel is injected from the fuel feed valve 15 toward the upstream side end face of the small-sized oxidation catalyst 14. Therefore, in this modification, part of the injected fuel F, as shown by the arrow E, passes through the inside of the through hole 48 and is sent into the exhaust purification catalyst 13.

Next, another embodiment for prevention of heat degradation of the exhaust purification catalyst 13 will be explained.

In this embodiment, to prevent heat degradation of the exhaust purification catalyst 13, fuel is intermittently injected from the fuel injector 15 continuously during engine operation. In this case, even if injecting fuel from the fuel injector 15 toward for example the small-sized oxidation catalyst 14, the injected fuel is dispersed, so part of the injected fuel, that is, the diesel oil, will not flow into the small-sized oxidation catalyst 14, but will run along the sides of the small-sized oxidation catalyst 14 and flow into the exhaust purification catalyst 13. In this way, if part of the fuel injected from the fuel feed valve 15, that is, the diesel oil, is made to flow into the exhaust purification catalyst 13, the upstream side end of the exhaust purification catalyst 13 will have heavy fuel contained in the diesel oil stuck to it. The precious metal catalyst etc. carried on the exhaust purification catalyst 13 will end up being covered by this heavy fuel.

As a result, as explained above, the upstream side end of the exhaust purification catalyst 13 will fall in activity, so the oxidation reaction at the upstream side end of the exhaust purification catalyst 13 will be suppressed and therefore the heat degradation of the upstream side end of the exhaust purification catalyst 13 can be prevented. The heavy fuel stuck to the upstream side end of the exhaust purification catalyst 13 will evaporate if the temperature of the exhaust purification catalyst 13 rises and thereby will flow through the exhaust purification catalyst 13 to the downstream side during which process it can be oxidized.

In this regard, the action of suppression of the oxidation reaction at the upstream side end of the exhaust purification catalyst 13 for preventing heat degradation of the exhaust purification catalyst 13 has to be performed continuously during engine operation. Therefore, in the present invention, the amount $Q_0$ of fuel required for preventing heat degradation of the exhaust purification catalyst 13 is injected intermittently from the fuel injector 15 continuously from right after engine startup to when the engine is stopped except for when a fuel injection action from the fuel feed valve 15 is performed.

Figure 28:
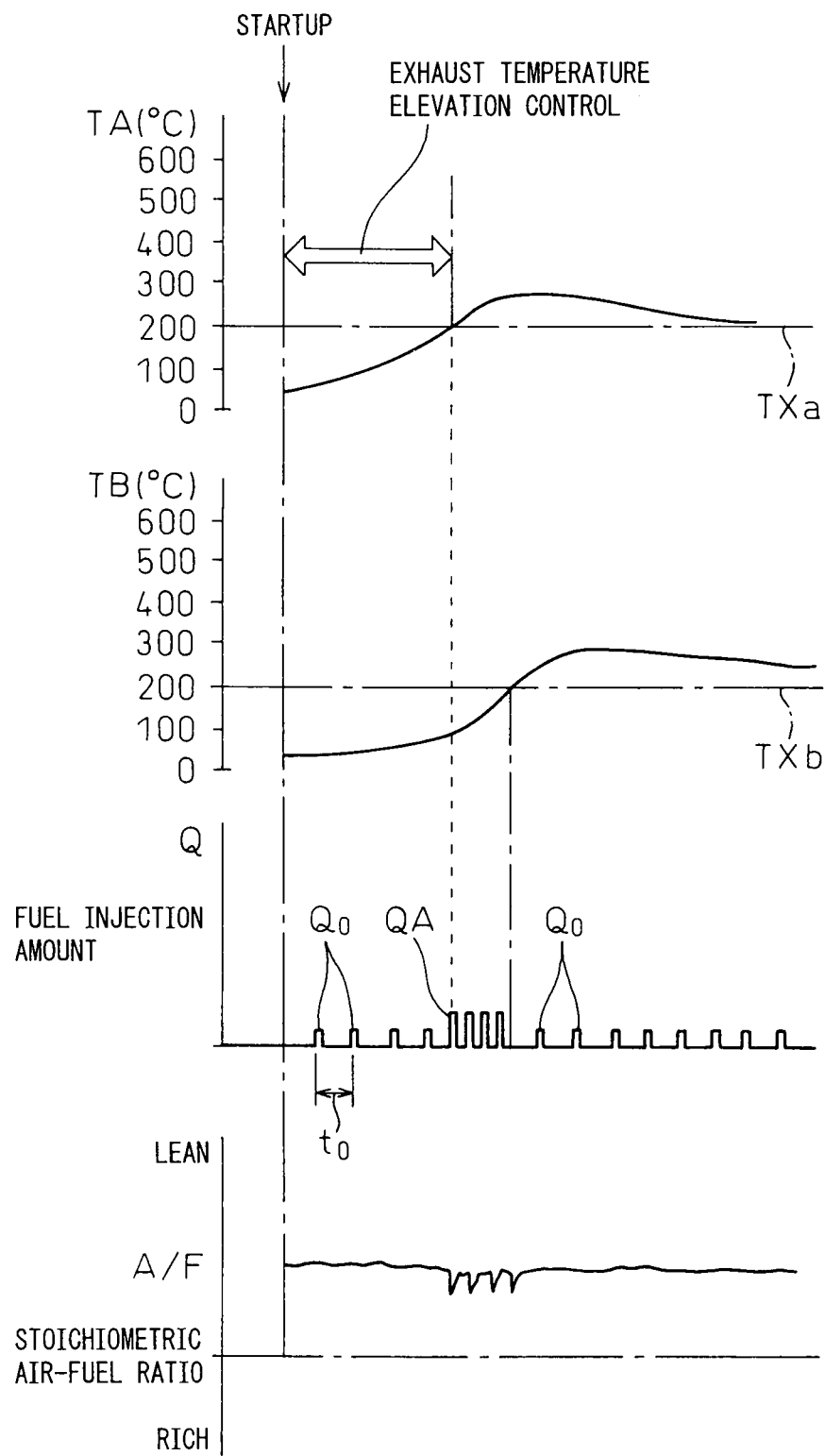
FIG. 28 is a time chart showing the basic control of exhaust purification.

FIG. 28 shows an example of the basic control of exhaust purification after engine start. This FIG. 28 is also shown taking as an example the case where the temperature TXa for activation of the small-sized oxidation catalyst 14 is 200° C. and the temperature TXb for activation of the exhaust purification catalyst 13 is 200° C. Note that, in FIG. 28, the change of the air-fuel ratio A/F of the exhaust gas flowing into the exhaust purification catalyst 13 is also shown.

In the example shown in FIG. 28, when the engine is started up, if the small-sized oxidation catalyst 14 is not activated, the temperature of the exhaust gas is made to rise until the small-sized oxidation catalyst 14 is activated in exhaust temperature elevation control. When the small-sized oxidation catalyst 14 is activated, the first amount QA of fuel is fed from the fuel feed valve 15 until the exhaust purification catalyst 13 is activated.

In this FIG. 28, the timing of feed of the amount $Q_0$ of fuel required for prevention of heat degradation of the exhaust purification catalyst 13 is shown. From FIG. 28, it will be understood that fuel $Q_0$ is fed immediately after engine start. Further, in the example shown in FIG. 28, the fuel $Q_0$ is fed every certain time period $t_0$. This fuel amount $Q_0$ is smaller than the first amount QA.

Figure 29:
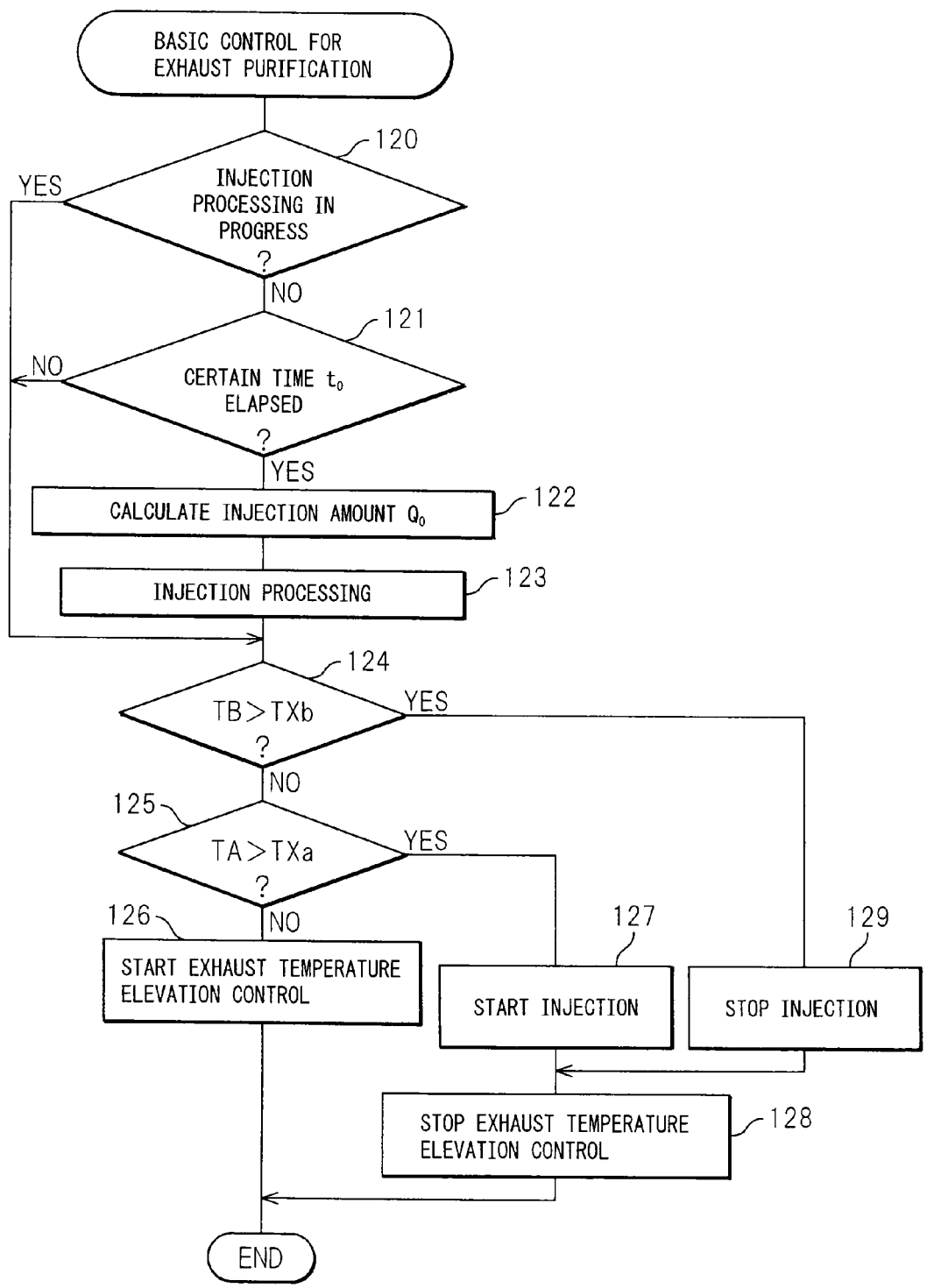
FIG. 29 is a flow chart for executing the basic control of exhaust purification, FIG. 30 are views showing smoke concentration etc., FIG. 31 are views showing various modifications, FIG. 32 are view showing various modifications, and FIG. 33 are views showing various modifications.

FIG. 29 shows the basic control in exhaust purification. This routine is executed by interruption every predetermined time interval.

Referring to FIG. 29, first of all, at step 120, it is determined if processing is being performed for injection of fuel from the fuel injector 15, that is, if processing is being performed for injection of the above-mentioned QA, QB, QN, and QS amounts of fuel. When processing is being performed for injection of fuel, the routine jumps to step 124, while when it is not being performed, the routine proceeds to step 121. At step 121, it is determined if a constant time $t_0$ has elapsed after fuel was last injected from the fuel injector 15. When a constant time $t_0$ has not elapsed after fuel was last injected, the routine jumps to step 124, while when it has elapsed, the routine proceeds to step 122. At step 122, the fuel amount $Q_0$ necessary for prevention of heat degradation of the exhaust purification catalyst 13 is calculated, then at the next step 123, processing is performed for injection of this fuel.

Next, at step 124, it is determined if the temperature TB of the exhaust purification catalyst 13 is higher than the TXb shown in FIG. 28, that is, if the exhaust purification catalyst 13 is activated or not. When the exhaust purification catalyst 13 is not activated, the routine proceeds to step 125 where it is determined if the temperature TA of the small-sized oxidation catalyst 14 is higher than the TXa shown in FIG. 28, that is, if the small-sized oxidation catalyst 14 is activated. When the small-sized oxidation catalyst 14 is not activated, the routine proceeds to step 126 where exhaust temperature elevation control is started.

Next, when it is judged at step 125 that the small-sized oxidation catalyst 14 is activated, the routine proceeds to step 127 where injection of the first amount QA of fuel from the fuel feed valve 15 is started. Next, at step 128, the exhaust temperature elevation control is stopped. On the other hand, when it is judged at step 124 that the exhaust purification catalyst 13 is activated, the routine proceeds to step 129 where injection of the first amount Q of fuel is stopped. Next, the routine proceeds to step 128.

On the other hand, if intermittently injecting fuel $Q_0$ from the fuel injector 15 to prevent heat degradation of the exhaust purification catalyst 13, it is possible to simultaneously prevent clogging of the fuel injector 15. Next, explaining this clogging simply, FIG. 30(A) shows the smoke concentration SMi ($SM_1 < SM_2 < \ldots < SMi < \ldots$) of the exhaust gas from the engine. As shown in FIG. 30(B), the higher the smoke concentration SM, the greater the amount of deposit at the nozzle port. If the amount deposit increases, clogging becomes easier.

Therefore, if considering clogging, when the amount of deposit becomes a constant level or more, that is, when the cumulative value of the smoke concentration becomes a constant value or more, fuel $Q_0$ is injected from the fuel injector 15. Further, when the exhaust gas temperature Te becomes high, to prevent the nozzle port from being overheated by the cooling action of the injected fuel, the injection amount $Q_0$, as shown in FIG. 30(C), can be increased as the exhaust temperature Te becomes higher. Even if injecting fuel by the amount $Q_0$ and timing considering clogging, it is possible to prevent heat degradation of the exhaust purification catalyst 13. Therefore, in this case, the amount $Q_0$ of fuel injected intermittently from the fuel injector 15 continuously during engine operation is made the amount necessary for prevention of heat degradation of the exhaust purification catalyst 13 and prevention of clogging of the nozzle port of the fuel feed valve 15.

Next, referring to FIG. 31 and FIG. 32, various modifications of the arrangement of the fuel feed valve 15 or of the arrangement and shape of the small-sized oxidation catalyst 14 will be successively explained.

First of all, if explained from FIG. 31(A), in the modification shown in this FIG. 31(A), the nozzle port of the fuel feed valve 15 is kept from being directly exposed to the flow of high temperature exhaust gas by arranging it in a recess formed in the wall surface of the exhaust pipe 12.

Further, in the modification shown in FIG. 31(B), the upstream side end face of the small-sized oxidation catalyst 14 is formed with a trough shaped fuel guide 14b extending from the peripheral edges of the upstream side end face upstream. Fuel is injected from the fuel feed valve 15 toward the fuel guide 14b. On the other hand, in the modification shown in FIG. 31(C), the small-sized oxidation catalyst 14 is arranged at a peripheral part inside the exhaust pipe 12.

Further, in the modification shown in FIG. 32(A) and FIG. 32(B), inside the engine exhaust passage upstream of the exhaust purification catalyst 13, an oxidation catalyst 14c is arranged extending across the entire cross-sectional flow of the exhaust gas heading toward the exhaust purification catalyst 13, that is, extending across the entire lateral cross-section of the exhaust pipe 12, and fuel is fed from the fuel feed valve 15 into part of the region of the upstream side end face of the oxidation catalyst 14c. The oxidation catalyst part 14 in the partial region where the fuel is fed forms what is referred to in the present invention as the "small-sized oxidation catalyst".

Note that, in the modification shown in FIG. 32(A), the small-sized oxidation catalyst 14 is formed at the center of the exhaust pipe 12. In the modification shown in FIG. 32(B), the small-sized oxidation catalyst 14 is formed at a periphery of the exhaust pipe 12. In the modification shown in FIGS. 32(A) and (B) as well, the heat of oxidation reaction due to the oxidation of the fuel F injected from the fuel feed valve 15 is used to raise the temperature of the small-sized oxidation catalyst 14, but at this time, the oxidation catalyst 14c part around the small-sized oxidation catalyst 14 also rises in temperature and therefore in these modifications, a purification action of exhaust gas is performed at this oxidation catalyst 14c part as well.

In the modification shown in FIG. 32(c), a pair of flow passages 12a, 12b branched from the flow passage of exhaust gas in the exhaust pipe 12 heading toward the exhaust purification catalyst 13 are formed. Inside one flow passage 12a among this pair of flow passages 12a, 12b, the small-sized oxidation catalyst 14 is arranged. From the fuel feed valve 15, fuel is injected toward the upstream side end face of the small-sized oxidation catalyst 14. In this modification as well, if viewed from the exhaust purification catalyst 13, the small-sized oxidation catalyst 14 is arranged at the partial region at the lateral cross-section of the upstream side exhaust flow passage.

FIG. 33 show various modifications of the exhaust purification processing system. However, in each modification, the small-sized oxidation catalyst 14 and fuel feed valve 15 are still arranged upstream of the exhaust purification catalyst 13 having the oxidation function.

In the modification shown in FIG. 33(A), in the same way as the embodiment shown in FIG. 1, the exhaust purification catalyst 13 is comprised of an oxidation catalyst. However, in this modification, the $NO_x$ storage catalyst 17 is arranged immediately downstream of the oxidation catalyst 13 and the oxidation catalyst 80 and particulate filter 16 are arranged downstream of the $NO_x$ storage catalyst 17. Furthermore, still another fuel feed valve 81 is arranged upstream of the oxidation catalyst 80.

On the other hand, in the modification shown in FIG. 33(B), the exhaust purification catalyst 13 is comprised of the $NO_x$ storage catalyst. Downstream of this $NO_x$ storage catalyst 13, in the same way as in FIG. 33(A), the fuel feed valve 81, oxidation catalyst 80, and particulate filter 16 are arranged. In the embodiment shown in FIGS. 33(A), (B), when regenerating the particulate filter 16, fuel is fed from the fuel feed valve 81 from only the fuel feed valve 81 or in addition to the fuel feed valve 15.

In the modification shown in FIG. 33(C), in the same way as the embodiment shown in FIG. 1, the exhaust purification catalyst 13 is comprised of an oxidation catalyst and, immediately downstream of the oxidation catalyst 13, a particulate filter 16 is arranged. However, in this modification, in the engine exhaust passage downstream of the exhaust purification catalyst 13 and particulate filter 16, an $NO_x$ selective reduction catalyst 82 able to reduce the $NO_x$ in the exhaust gas in the presence of ammonia and an aqueous urea feed valve 83 for feeding aqueous urea to the $NO_x$ selective reduction catalyst 82 are arranged. From the aqueous urea feed valve 83, the amount of aqueous urea required for reducing the $NO_x$ contained in the exhaust gas is fed. The $NO_x$ in the exhaust gas is reduced by the ammonia produced from the aqueous urea in the $NO_x$ selective reduction catalyst 82.

In this modification, when activating the $NO_x$ selective reduction catalyst 82, as shown in FIG. 4 or FIG. 5, the first amount QA of fuel is fed from the fuel feed valve 15 or, as shown in FIG. 6 to FIG. 9, the second amount QB of fuel is fed. That is, one or both of the first amount QA of fuel or the second amount QB of fuel are fed.

LIST OF REFERENCE NUMERALS

4 . . . intake manifold
5 . . . exhaust manifold
7 . . . exhaust turbocharger
12 . . . exhaust pipe
13 . . . exhaust purification catalyst
14 . . . small-sized oxidation catalyst
15 . . . fuel feed valve
16 . . . particulate filter
17 . . . $NO_x$ storage catalyst

The invention claimed is:

1. An exhaust purification device of an internal combustion engine, comprising:
   an engine exhaust passage for directing an exhaust gas;
   an exhaust purification catalyst having an oxidation function arranged in the engine exhaust passage;
   a small-sized oxidation catalyst arranged in the engine exhaust passage upstream of the exhaust purification catalyst; and
   a fuel feed valve for feeding fuel into the small-sized oxidation catalyst arranged in the engine exhaust passage upstream of the exhaust purification catalyst;
   wherein the small-sized oxidation catalyst has a volume smaller than the exhaust purification catalyst, and the small-sized oxidation catalyst receives and passes through a part of the exhaust gas flowing into the exhaust purification catalyst,
   wherein a first amount of fuel required for the small-sized oxidation catalyst to emit heat is fed from the fuel feed valve when using a heat of oxidation reaction generated at the small-sized oxidation catalyst due to a fuel fed from the fuel feed valve to raise the exhaust purification catalyst in temperature,
   wherein an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst,
   wherein when using the reformed fuel flowing out from the small-sized oxidation catalyst so as to make the temperature of the exhaust purification catalyst rise or when performing an exhaust purification processing at the exhaust purification catalyst, a temperature of the exhaust gas flowing out from a combustion chamber is made to rise or an amount of unburned HC discharged from the combustion chamber is made to increase, and
   wherein when the temperature of the exhaust gas flowing out from the combustion chamber is made to rise, if the temperature of the small-sized oxidation catalyst reaches a predetermined allowable temperature, the amount of fuel fed from the fuel feed valve is made to decrease and the temperature of the exhaust gas discharged from the combustion chamber is made to further rise.

2. The exhaust purification device of an internal combustion engine as claimed in claim 1, wherein said first amount is made up of an amount necessary for suppressing outflow of the reformed fuel from the small-sized oxidation catalyst while enabling the small-sized oxidation catalyst to emit heat and wherein when feeding more than said first amount of fuel from the fuel feed valve, the amount of outflow of reformed fuel from the small-sized oxidation catalyst is made to increase.

3. The exhaust purification device of an internal combustion engine as claimed in claim 1, wherein when the exhaust purification catalyst is not activated or when the exhaust purification catalyst changes from an activated state to a non-active state, if the exhaust purification catalyst should be activated, said first amount of fuel is fed and thereby the small-sized oxidation catalyst is made to emit heat.

4. The exhaust purification device of an internal combustion engine as claimed in claim 3, wherein when the exhaust purification catalyst should be activated, if the small-sized oxidation catalyst is not activated, the small-sized oxidation catalyst is activated, then said first amount of fuel starts to be fed.

5. The exhaust purification device of an internal combustion engine as claimed in claim 4, wherein when the exhaust purification catalyst should be activated, if the small-sized oxidation catalyst is not activated, the temperature of the exhaust gas discharged from the combustion chamber is made to rise until the small-sized oxidation catalyst is activated.

6. The exhaust purification device of an internal combustion engine of claim 1, wherein when the temperature of the exhaust purification catalyst should be raised, if the exhaust purification catalyst is not activated, the small-sized oxidation catalyst is made to emit heat so as to activate the exhaust purification catalyst, then a second amount of fuel greater than the first amount starts to be fed from the fuel feed valve.

7. The exhaust purification device of an internal combustion engine as claimed in claim 1, wherein when the temperature of the exhaust purification catalyst should be raised, if the exhaust purification catalyst is activated, a second amount of fuel greater than the first amount starts to be fed from the fuel feed valve immediately if the small-sized oxidation catalyst is activated and after the small-sized oxidation catalyst is activated if the small-sized oxidation catalyst is not activated.

8. The exhaust purification device of an internal combustion engine as claimed in claim 1, wherein an injection timing of fuel injected into the combustion chamber is retarded so as to make the temperature of the exhaust gas discharged from the combustion chamber rise.

9. The exhaust purification device of an internal combustion engine as claimed in claim 1, wherein in a latter half of an expansion stroke or during an exhaust stroke, additional fuel is fed into the combustion chamber so as to make the amount of unburned HC discharged from the combustion chamber increase.

10. The exhaust purification device of an internal combustion engine as claimed in claim 1, wherein when feeding fuel from said fuel feed valve to the small-sized oxidation catalyst, part of the fed fuel is made to run along the sides of the small-sized oxidation catalyst so as to flow into the exhaust purification catalyst without being allowed to flow into the small-sized oxidation catalyst.

11. The exhaust purification device of an internal combustion engine as claimed in claim 10, wherein said small-sized oxidation catalyst is formed at its center part with a through hole for fuel flow extending along the direction of flow of exhaust gas.

12. The exhaust purification device of an internal combustion engine as claimed in claim 1, wherein a fuel injector disposed in the engine exhaust passage intermittently injects fuel continuously during engine operation.

13. The exhaust purification device of an internal combustion engine as claimed in claim 1, wherein the exhaust purification catalyst is comprised of an oxidation catalyst, a particulate filter for trapping particulate in the exhaust gas is arranged in the engine exhaust passage downstream of the exhaust purification catalyst, and a second amount of fuel greater than said first amount is fed from the fuel feed valve when making the particulate filter rise in temperature to regenerate the particulate filter.

14. The exhaust purification device of an internal combustion engine as claimed in claim 1, wherein the exhaust purification catalyst is comprised of an NOx storage catalyst storing NOx contained in exhaust gas when an air-fuel ratio of an inflowing exhaust gas is lean and releasing stored NOx when the air-fuel ratio of the inflowing exhaust gas becomes rich and wherein when making the air-fuel ratio of the exhaust gas rich so as to release NOx from the NOx storage catalyst, a third amount of fuel of an amount of feed per unit time greater than said first amount is fed from the fuel feed valve.

15. The exhaust purification device of an internal combustion engine as claimed in claim 1, wherein when making a NOx storage catalyst rise in temperature to a SOx release temperature, a second amount of fuel greater than said first amount is fed from the fuel feed valve and when releasing SOx from the NOx storage catalyst by maintaining the temperature of the NOx storage catalyst at the SOx release temperature while making the air-fuel ratio of the exhaust gas rich, a fourth amount of fuel of an amount of feed per unit time greater than a second amount is fed from the fuel feed valve.

16. The exhaust purification device of an internal combustion engine as claimed in claim 1, wherein in the engine exhaust passage downstream of the exhaust purification catalyst, an NOx selective reduction catalyst able to reduce NOx in the exhaust gas in the presence of ammonia and an aqueous urea feed valve for feeding aqueous urea to the NOx selective reduction catalyst are arranged and, when the NOx selective reduction catalyst should be activated, either said first amount of fuel or a second amount of fuel greater than said first amount of fuel is fed from the fuel feed valve.

17. The exhaust purification device of an internal combustion engine as claimed in claim 1, wherein said small-sized oxidation catalyst forms a tubular shape having a cross-section smaller than the total cross-sectional flow of exhaust gas heading toward the exhaust purification catalyst and extending in the direction of flow of the exhaust gas.

18. The exhaust purification device of an internal combustion engine as claimed in claim 17, wherein said small-sized oxidation catalyst is arranged at a center of an exhaust pipe through which exhaust gas heading toward the exhaust purification catalyst flows.

19. The exhaust purification device of an internal combustion engine as claimed in claim 17, wherein said small-sized oxidation catalyst is arranged at a peripheral part inside an exhaust pipe through which exhaust gas heading toward the exhaust purification catalyst flows.

20. The exhaust purification device of an internal combustion engine as claimed in claim 17, wherein the flow passage of the exhaust gas heading toward the exhaust purification catalyst is formed from a pair of flow passages, and said small-sized oxidation catalyst is arranged in one of the flow passages among the pair of flow passages.

21. The exhaust purification device of an internal combustion engine as claimed in claim 17, wherein fuel is injected from the fuel feed valve toward an upstream end face of the small-sized oxidation catalyst.

22. The exhaust purification device of an internal combustion engine as claimed in claim 17, wherein an upstream side end face of the small-sized oxidation catalyst is formed with a fuel guide extending from a peripheral edge of said upstream side end face toward the upstream side, and fuel is injected from the fuel feed valve toward the fuel guide.

23. The exhaust purification device of an internal combustion engine as claimed in claim 1, wherein inside the engine exhaust passage upstream of the exhaust purification catalyst, an oxidation catalyst is arranged extending across the entire cross-sectional flow of the exhaust gas heading toward the exhaust purification catalyst, fuel is fed from the fuel feed valve into a partial region of an upstream side end face of said oxidation catalyst, and the oxidation catalyst part in the partial region fed with fuel comprises said small-sized oxidation catalyst.

24. An exhaust purification device of an internal combustion engine, comprising:
an engine exhaust passage for directing an exhaust gas;
an exhaust purification catalyst having an oxidation function arranged in the engine exhaust passage;
a small-sized oxidation catalyst arranged in the engine exhaust passage upstream of the exhaust purification catalyst; and
a fuel feed valve for feeding fuel into the small-sized oxidation catalyst arranged in the engine exhaust passage upstream of the exhaust purification catalyst;
wherein the small-sized oxidation catalyst has a volume smaller than the exhaust purification catalyst, and the small-sized oxidation catalyst receives and passes through a part of the exhaust gas flowing into the exhaust purification catalyst,
wherein a first amount of fuel required for the small-sized oxidation catalyst to emit heat is fed from the fuel feed valve when using a heat of oxidation reaction generated at the small-sized oxidation catalyst due to a fuel fed from the fuel feed valve to raise the exhaust purification catalyst in temperature,
wherein an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst,
wherein when using the reformed fuel flowing out from the small-sized oxidation catalyst so as to make the temperature of the exhaust purification catalyst rise or when performing an exhaust purification processing at the exhaust purification catalyst, a temperature of the exhaust gas flowing out from a combustion chamber is made to rise or an amount of unburned HC discharged from the combustion chamber is made to increase, and
wherein when the amount of unburned HC discharged from the combustion chamber is increased, if the temperature of the small-sized oxidation catalyst reaches a predetermined allowable temperature, the amount of fuel fed from the fuel feed valve is made to decrease and the amount of unburned HC discharged from the combustion chamber is made to further increase.

25. An exhaust purification device of an internal combustion engine, comprising:
an engine exhaust passage for directing an exhaust gas;
an exhaust purification catalyst having an oxidation function arranged in the engine exhaust passage;
a small-sized oxidation catalyst arranged in the engine exhaust passage upstream of the exhaust purification catalyst; and
a fuel feed valve for feeding fuel into the small-sized oxidation catalyst arranged in the engine exhaust passage upstream of the exhaust purification catalyst;
wherein the small-sized oxidation catalyst has a volume smaller than the exhaust purification catalyst, and the small-sized oxidation catalyst receives and passes through a part of the exhaust gas flowing into the exhaust purification catalyst,
wherein a first amount of fuel required for the small-sized oxidation catalyst to emit heat is fed from the fuel feed valve when using a heat of oxidation reaction generated at the small-sized oxidation catalyst due to a fuel fed from the fuel feed valve to raise the exhaust purification catalyst in temperature,
wherein an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst,
wherein when feeding fuel from said fuel feed valve to the small-sized oxidation catalyst, part of the fed fuel is made to run along the sides of the small-sized oxidation catalyst so as to flow into the exhaust purification catalyst without being allowed to flow into the small-sized oxidation catalyst, and
wherein fuel is injected from said fuel feed valve toward an upstream side end face of the small-sized oxidation catalyst and an atomization region of fuel injected from the fuel feed valve in a plane including said upstream side end face is broader than a region of said upstream side end face.

26. An exhaust purification device of an internal combustion engine, comprising:
an engine exhaust passage for directing an exhaust gas;
an exhaust purification catalyst having an oxidation function arranged in the engine exhaust passage;
a small-sized oxidation catalyst arranged in the engine exhaust passage upstream of the exhaust purification catalyst; and
a fuel feed valve for feeding fuel into the small-sized oxidation catalyst arranged in the engine exhaust passage upstream of the exhaust purification catalyst;
wherein the small-sized oxidation catalyst has a volume smaller than the exhaust purification catalyst, and the small-sized oxidation catalyst receives and passes through a part of the exhaust gas flowing into the exhaust purification catalyst,
wherein a first amount of fuel required for the small-sized oxidation catalyst to emit heat is fed from the fuel feed valve when using a heat of oxidation reaction generated at the small-sized oxidation catalyst due to a fuel fed from the fuel feed valve to raise the exhaust purification catalyst in temperature,
wherein an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst, wherein a fuel injector disposed in the engine exhaust passage intermittently injects fuel continuously during engine operation, and wherein an amount of fuel required for preventing head degradation of the exhaust purification catalyst is injected intermittently from the fuel injector continuously from right after engine startup to when the engine is stopped except when fuel is being injected from the fuel feed valve.

27. An exhaust purification device of an internal combustion engine, comprising:

an engine exhaust passage for directing an exhaust gas;

an exhaust purification catalyst having an oxidation function arranged in the engine exhaust passage;

a small-sized oxidation catalyst arranged in the engine exhaust passage upstream of the exhaust purification catalyst; and a fuel feed valve for feeding fuel into the small-sized oxidation catalyst arranged in the engine exhaust passage upstream of the exhaust purification catalyst;

wherein the small-sized oxidation catalyst has a volume smaller than the exhaust purification catalyst, and the small-sized oxidation catalyst receives and passes through a part of the exhaust gas flowing into the exhaust purification catalyst, wherein a first amount of fuel required for the small-sized oxidation catalyst to emit heat is fed from the fuel feed valve when using a heat of oxidation reaction generated at the small-sized oxidation catalyst due to a fuel fed from the fuel feed valve to raise the exhaust purification catalyst in temperature, wherein an amount of fuel greater than the first amount is fed from the fuel feed valve when reforming fuel fed from the fuel feed valve by the small-sized oxidation catalyst and using a reformed fuel flowing out from the small-sized oxidation catalyst to raise the exhaust purification catalyst in temperature or performing exhaust purification processing in the exhaust purification catalyst, wherein a fuel injector disposed in the engine exhaust passage intermittently injects fuel continuously during engine operation, and wherein the amount of fuel intermittently injected from the fuel injector continuously during engine operation is made up of an amount necessary for preventing heat degradation of the exhaust purification catalyst and preventing clogging of a nozzle port of the fuel feed valve.

* * * * *